(12) United States Patent
Capper et al.

(10) Patent No.: US 9,383,814 B1
(45) Date of Patent: Jul. 5, 2016

(54) PLUG AND PLAY WIRELESS VIDEO GAME

(76) Inventors: David G. Capper, Novato, CA (US);
Andrew S. Filo, Cupertino, CA (US)

( * ) Notice: Subject to any disclaimer, the term of this patent is extended or adjusted under 35 U.S.C. 154(b) by 613 days.

(21) Appl. No.: 12/617,633

(22) Filed: Nov. 12, 2009

Related U.S. Application Data

(60) Provisional application No. 61/113,933, filed on Nov. 12, 2008.

(51) Int. Cl.
*A63F 9/24* (2006.01)
*G06F 3/00* (2006.01)

(52) U.S. Cl.
CPC ........................................ *G06F 3/00* (2013.01)

(58) Field of Classification Search
USPC .................. 463/1, 36, 39; 345/156
See application file for complete search history.

(56) References Cited

U.S. PATENT DOCUMENTS

| | | | |
|---|---|---|---|
| 3,504,334 A | 3/1970 | Turnage | |
| 3,792,243 A | 2/1974 | Appel et al. | |
| 3,838,212 A | 9/1974 | Whetstone et al. | |
| 3,886,361 A | 5/1975 | Wester | |
| 4,111,421 A | 9/1978 | Mierzwinski | |
| 4,137,651 A | 2/1979 | Pardes et al. | |
| 4,210,329 A | 7/1980 | Steiger et al. | |
| 4,309,781 A | 1/1982 | Lissau | |
| 4,317,005 A | 2/1982 | de Bruyne | |
| 4,414,537 A | 11/1983 | Grimes | |
| 4,517,559 A | 5/1985 | Deitch et al. | |
| 4,521,772 A | 6/1985 | Lyon | |
| 4,521,870 A | 6/1985 | Babbel et al. | |
| 4,524,348 A | 6/1985 | Lefkowitz | |
| 4,542,291 A | 9/1985 | Zimmerman | |
| 4,545,583 A | 10/1985 | Pearman et al. | |
| 4,550,250 A | 10/1985 | Mueller et al. | |
| 4,564,928 A | 1/1986 | Glenn et al. | |
| 4,565,999 A | 1/1986 | King et al. | |
| 4,578,674 A | 3/1986 | Baker et al. | |
| 4,654,648 A | 3/1987 | Herrington et al. | |
| 4,682,159 A | 7/1987 | Davison | |

(Continued)

FOREIGN PATENT DOCUMENTS

| | | |
|---|---|---|
| JP | 60-069728 | 4/1985 |
| JP | 62-014528 | 1/1987 |
| JP | 63-167534 | 7/1988 |

OTHER PUBLICATIONS

Foley, James D., "Interfaces for Advance Computing," Oct. 1987, pp. 127-135, Scientific America.

(Continued)

*Primary Examiner* — Paul A D'Agostino
(74) *Attorney, Agent, or Firm* — Haverstock & Owens LLP

(57) ABSTRACT

A video game device and method are provided. The device is a cordless touch-free video game device that is plug and play. The device includes an array of light transmitters for transmitting a light signal to an object. The object can be retroreflectors that are attached to a user's feet or hands. Upon striking the objects, the transmitted signal is reflected, producing a reflected light signal. A light receiver including a detection array receives the reflected signal from the objects and the reflected signal is transformed into a second signal used to send and track motion of the objects. The motion is used by a game device that determines an activity of the user by sensing the type of user movement performed. The device is ideally suited for controlling cursor position for use with video dance games.

23 Claims, 17 Drawing Sheets

(56) References Cited

U.S. PATENT DOCUMENTS

| | | | |
|---|---|---|---|
| 4,713,545 A | 12/1987 | Norrgren et al. | |
| 4,771,344 A | 9/1988 | Fallacaro et al. | |
| 4,782,328 A | 11/1988 | Denlinger | |
| 4,791,416 A | 12/1988 | Adler | |
| 4,796,019 A | 1/1989 | Auerbach | |
| 4,799,687 A | 1/1989 | Davis et al. | |
| 4,837,430 A | 6/1989 | Hasegawa | |
| 4,910,464 A | 3/1990 | Trett et al. | |
| 4,924,216 A | 5/1990 | Leung | |
| RE33,662 E | 8/1991 | Blair et al. | |
| 5,191,461 A | 3/1993 | Cranshaw et al. | |
| 5,288,078 A | 2/1994 | Capper et al. | |
| 5,384,652 A | 1/1995 | Allen et al. | |
| 5,506,682 A * | 4/1996 | Pryor | 356/623 |
| 5,521,616 A * | 5/1996 | Capper et al. | 345/156 |
| 5,534,917 A | 7/1996 | MacDougall | |
| 5,616,078 A * | 4/1997 | Oh | 463/39 |
| 5,914,487 A * | 6/1999 | Ramer et al. | 250/237 R |
| 5,982,352 A * | 11/1999 | Pryor | 345/156 |
| 6,088,091 A * | 7/2000 | Ramer et al. | 356/141.5 |
| 6,144,366 A * | 11/2000 | Numazaki et al. | 345/156 |
| 6,353,428 B1 | 3/2002 | Maggioni et al. | |
| 6,674,895 B2 * | 1/2004 | Rafii et al. | 382/154 |
| 6,955,603 B2 * | 10/2005 | Jeffway et al. | 463/36 |
| 7,015,950 B1 * | 3/2006 | Pryor | 348/207.11 |
| 7,058,204 B2 | 6/2006 | Hildreth et al. | |
| 7,190,263 B2 | 3/2007 | McKay et al. | |
| 7,227,526 B2 | 6/2007 | Hildreth et al. | |
| 7,259,747 B2 | 8/2007 | Bell | |
| 7,322,889 B2 * | 1/2008 | Ueshima | 463/34 |
| 7,348,963 B2 | 3/2008 | Bell | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,421,093 B2 | 9/2008 | Hildreth et al. | |
| 7,430,312 B2 | 9/2008 | Gu | |
| 7,450,250 B2 * | 11/2008 | Venkatesh et al. | 356/620 |
| 7,473,884 B2 * | 1/2009 | Fouquet et al. | 250/221 |
| 7,555,142 B2 | 6/2009 | Hildreth et al. | |
| 7,570,805 B2 | 8/2009 | Gu | |
| 7,574,020 B2 | 8/2009 | Shamaie | |
| 7,576,727 B2 | 8/2009 | Bell | |
| 7,609,249 B2 * | 10/2009 | Fouquet et al. | 345/156 |
| 7,710,391 B2 | 5/2010 | Bell et al. | |
| 7,737,393 B2 * | 6/2010 | Fouquet et al. | 250/221 |
| 7,777,899 B1 | 8/2010 | Hildreth | |
| 7,778,942 B2 | 8/2010 | Naito | |
| 7,809,167 B2 | 10/2010 | Bell | |
| 7,812,816 B2 * | 10/2010 | Wenstrand | 345/156 |
| 7,822,267 B2 | 10/2010 | Gu | |
| 7,827,698 B2 | 11/2010 | Jaiswal et al. | |
| 7,834,846 B1 | 11/2010 | Bell | |
| 7,840,031 B2 * | 11/2010 | Albertson et al. | 382/103 |
| 7,848,542 B2 | 12/2010 | Hildreth | |
| 7,853,041 B2 | 12/2010 | Shamaie | |
| 7,878,586 B2 | 2/2011 | Kneller et al. | |
| 7,898,522 B2 | 3/2011 | Hildreth et al. | |
| 7,920,179 B2 | 4/2011 | Thorn | |
| 7,944,685 B2 | 5/2011 | Nabais Nobre | |
| 7,953,271 B2 | 5/2011 | Gu | |
| 7,957,554 B1 | 6/2011 | Silver et al. | |
| 8,015,718 B2 | 9/2011 | Jaiswal et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,068,641 B1 | 11/2011 | Hildreth | |
| 8,068,693 B2 | 11/2011 | Sorek et al. | |
| 8,081,822 B1 | 12/2011 | Bell | |
| 8,094,873 B2 | 1/2012 | Kelosky et al. | |
| 8,098,277 B1 | 1/2012 | Bell | |
| 8,110,178 B2 | 2/2012 | Fujikawa et al. | |
| 8,116,518 B2 | 2/2012 | Shamaie et al. | |
| 8,146,020 B2 | 3/2012 | Clarkson | |
| 8,157,652 B2 | 4/2012 | Nguyen et al. | |
| 8,170,281 B2 | 5/2012 | Shamaie | |
| 8,218,858 B2 | 7/2012 | Gu | |
| 8,384,663 B2 * | 2/2013 | Fouquet et al. | 345/156 |
| 2003/0058412 A1 * | 3/2003 | Owen et al. | 353/31 |
| 2004/0087366 A1 * | 5/2004 | Shum et al. | 463/36 |
| 2006/0028656 A1 * | 2/2006 | Venkatesh et al. | 356/620 |
| 2006/0033713 A1 * | 2/2006 | Pryor | 345/158 |
| 2006/0158522 A1 * | 7/2006 | Pryor | 348/207.99 |
| 2006/0223637 A1 * | 10/2006 | Rosenberg | 463/47 |
| 2006/0237633 A1 * | 10/2006 | Fouquet et al. | 250/221 |
| 2006/0238492 A1 * | 10/2006 | Fouquet et al. | 345/156 |
| 2006/0238499 A1 * | 10/2006 | Wenstrand | 345/156 |
| 2006/0279745 A1 * | 12/2006 | Wenstrand et al. | 356/614 |
| 2007/0117628 A1 * | 5/2007 | Stanley | 463/36 |
| 2007/0155502 A1 * | 7/2007 | Wu | 463/37 |
| 2008/0018595 A1 | 1/2008 | Hildreth et al. | |
| 2008/0166022 A1 | 7/2008 | Hildreth | |
| 2008/0170123 A1 * | 7/2008 | Albertson et al. | 348/157 |
| 2008/0208517 A1 | 8/2008 | Shamaie | |
| 2008/0219502 A1 | 9/2008 | Shamaie | |
| 2008/0267521 A1 | 10/2008 | Gao et al. | |
| 2008/0273755 A1 | 11/2008 | Hildreth | |
| 2008/0280676 A1 | 11/2008 | Distanik et al. | |
| 2008/0281633 A1 | 11/2008 | Burdea et al. | |
| 2009/0027337 A1 | 1/2009 | Hildreth | |
| 2009/0031240 A1 | 1/2009 | Hildreth | |
| 2009/0051648 A1 | 2/2009 | Shamaie et al. | |
| 2009/0052785 A1 | 2/2009 | Shamaie | |
| 2009/0078858 A1 * | 3/2009 | Fouquet et al. | 250/221 |
| 2009/0079813 A1 | 3/2009 | Hildreth | |
| 2009/0109036 A1 | 4/2009 | Schalla et al. | |
| 2009/0124379 A1 | 5/2009 | Wells | |
| 2009/0133051 A1 | 5/2009 | Hildreth | |
| 2009/0138805 A1 | 5/2009 | Hildreth | |
| 2009/0217211 A1 | 8/2009 | Hildreth et al. | |
| 2009/0315740 A1 | 12/2009 | Hildreth et al. | |
| 2010/0001950 A1 * | 1/2010 | Fouquet et al. | 345/156 |
| 2010/0039379 A1 | 2/2010 | Hildreth | |
| 2010/0040292 A1 | 2/2010 | Clarkson | |
| 2010/0066667 A1 | 3/2010 | MacDougall et al. | |
| 2010/0066763 A1 | 3/2010 | MacDougall et al. | |
| 2010/0091110 A1 | 4/2010 | Hildreth | |
| 2010/0170052 A1 | 7/2010 | Ortins et al. | |
| 2010/0259474 A1 | 10/2010 | Hildreth | |
| 2010/0277075 A1 | 11/2010 | Rees | |
| 2010/0281636 A1 | 11/2010 | Ortins et al. | |
| 2010/0295946 A1 | 11/2010 | Reed et al. | |
| 2010/0315491 A1 | 12/2010 | Carter et al. | |
| 2011/0013024 A1 * | 1/2011 | Pryor | 348/207.11 |
| 2011/0038530 A1 | 2/2011 | Gu | |
| 2011/0068227 A1 | 3/2011 | Kneller et al. | |
| 2011/0074974 A1 | 3/2011 | Hildreth | |
| 2011/0080490 A1 | 4/2011 | Clarkson et al. | |
| 2011/0197132 A1 | 8/2011 | Escoda et al. | |
| 2011/0210943 A1 | 9/2011 | Zaliva | |
| 2011/0242344 A1 | 10/2011 | Elwell et al. | |
| 2011/0247156 A1 | 10/2011 | Schmid et al. | |
| 2011/0260998 A1 | 10/2011 | Ludwig | |
| 2012/0007821 A1 | 1/2012 | Zaliva | |
| 2012/0016960 A1 | 1/2012 | Gelb et al. | |

OTHER PUBLICATIONS

"Q&A: Gesture Tek Talks Xbox 360 Camera Innovation," Gamasutra, accessed Feb. 1, 2012, <http://www.gamasutra.com/php-bin/news_index.php?story=11215>.

J.J. Marotta, W,P. Medendorp, J.D. Crawford "Kinematic Rules for Upper and Lower Arm Contributions to Grasp Orientation", J Neurophysiol 90: 3816-3827 (2003).

A.G.Bharatkumar et al., "Lover Limb Kinematics of Human Walking with the Medial Axis Transformation", Proceedings of the 1994 IEEE Workshop on Motion of Non-Rigid and Articulated Objects, pp. 70-76 (1994).

W.P. Medendorp, J.D. Crawford, D.Y.P. Henriques, J.A.M. Van Gisbergen, C.C.A.M. Gielen "Kinematic Strategies for Upper Arm-Forearm Coordination in Three Dimensions", Journal of Neurophysiology 84:2302-2316 (2000).

* cited by examiner

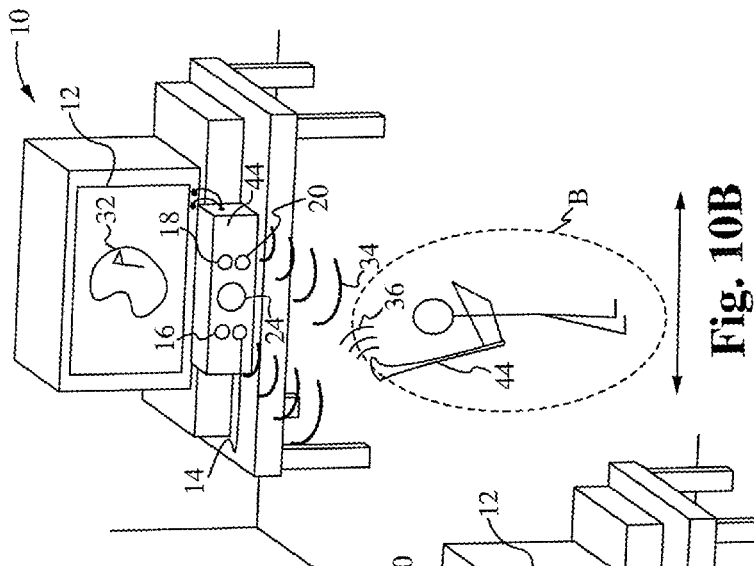
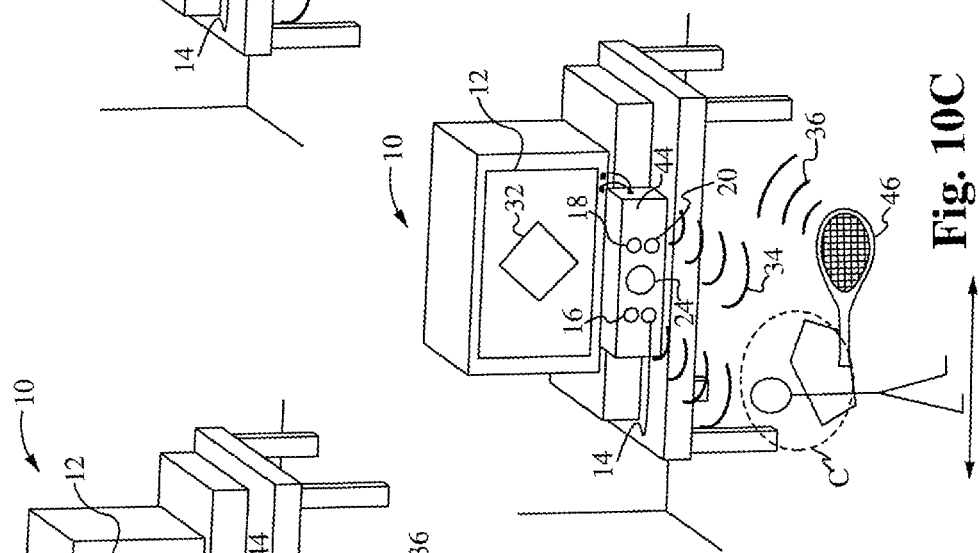
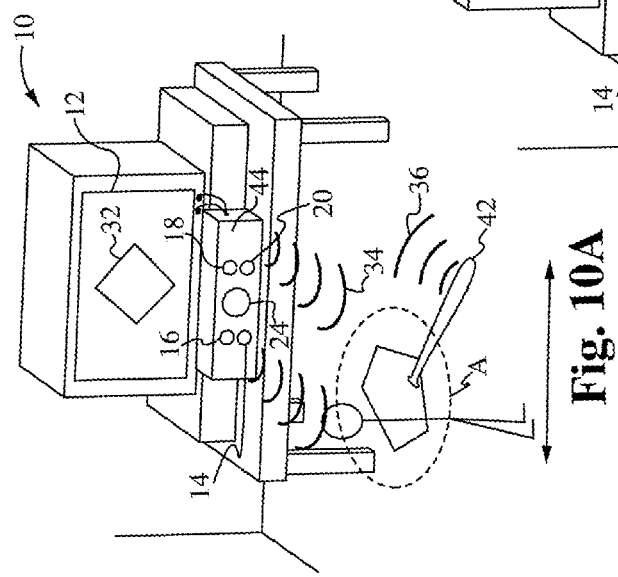

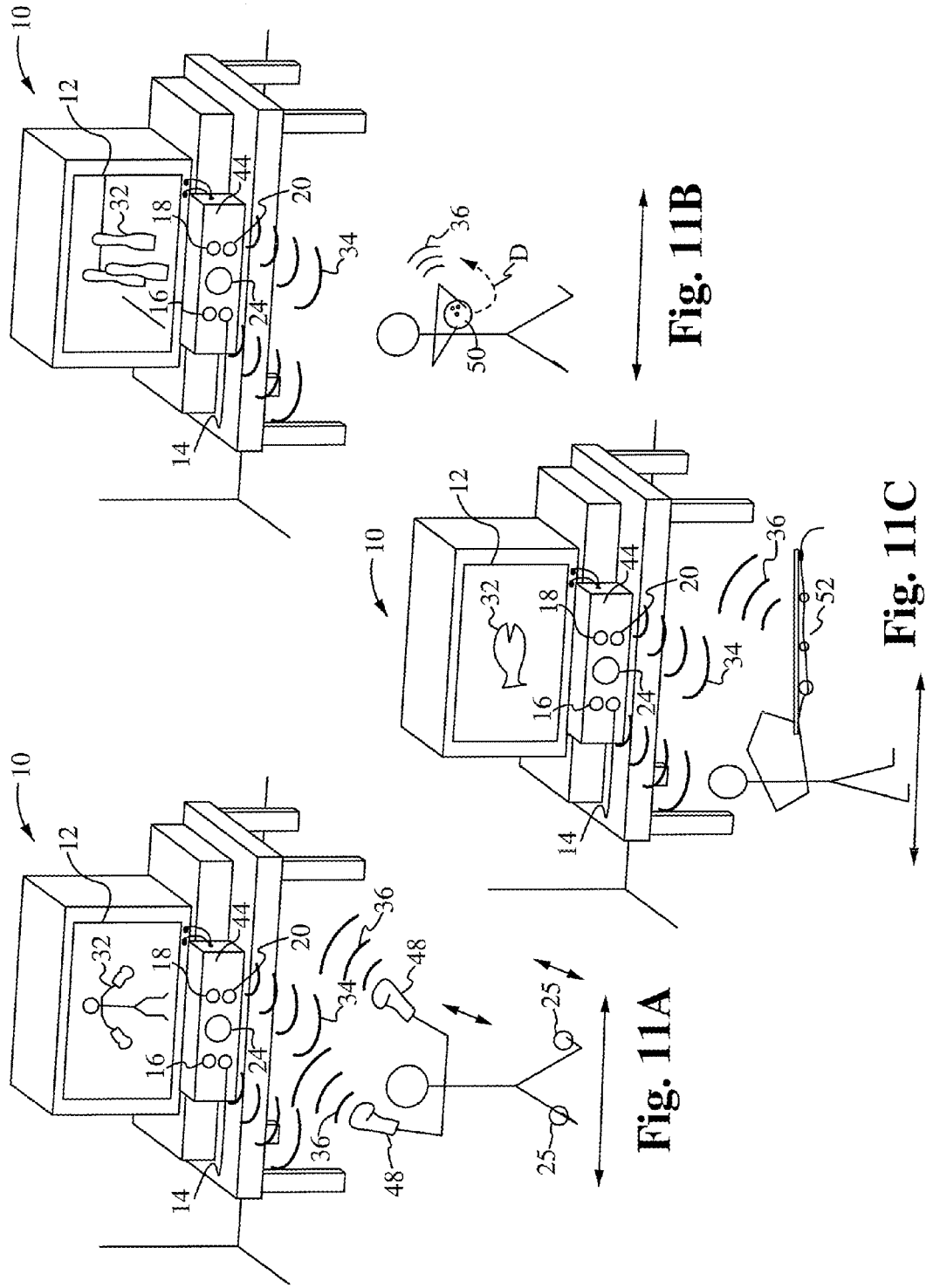

PLUG AND PLAY WIRELESS VIDEO GAME

RELATED APPLICATION

This application claims priority under 35 U.S.C. §119(e) of the U.S. provisional patent application Ser. No. 61/113,933, filed Nov. 12, 2008, and titled "Plug and Play Wireless Video Game," which is hereby incorporated by reference.

FIELD OF THE INVENTION

The present invention is related to the field of video games. More specifically, the present invention relates to plug-and-play video games with wireless controllers.

BACKGROUND

Electronic video games have enjoyed large acceptance in the marketplace. Video games have incorporated wireless configurations to increase their ease and enjoyment. Conventional wireless video games require a user to stand near the console and limit the types of motion that the game can detect. Also, conventional video games require a user to hold one or more active elements that increase the cost of the video device. The user registers a motion in the game by performing a preset motion. One drawback with such an approach is the user lacks ease in switching between different types of activities that are included within the video game. Many additional game components must be stored when the game is not in use. Another drawback is that game play is limited to the predetermined number of motions. The game cannot recognize feet placement or hand motion except in precisely defined positions, nor can the game recognize or incorporate movement as a game play feature. Still other games require the user to carry or hold an electronic controller with buttons or with accelerometers and radio transmitters. Such complex controllers can increase the complexity and price of a game and requires the user to interact with the game in an artificial and unnatural way.

An ideal video game control device would merely sense the position of each of the user's feet or hands without requiring the user to hold additional active components such as those that use expensive radio frequency oscillators. Further, the device can determine an activity of the user by sensing the type of user movement performed. Such a device would be extremely easy for the user to operate. Further, such a device would greatly simplify and enhance the playing of video games.

SUMMARY OF THE INVENTION

The present invention allows a user to interact with a video game or other electronic device using natural motions. The system includes a light (e.g., optical) transmitter or a plurality of such transmitters. The system also includes at least one optical receiver. Preferably, the receiver is an array of receivers such as in a CCD (charge coupled device) camera. An optical system, such as lenses can optionally be mounted to the transmitters. Likewise, an optical system, such as lenses can optionally be mounted to the receivers. The user places her body into the field of view of the transmitters and optical radiation is reflected from her body onto the receivers. In some embodiments, the user wears or affixes to her clothes or shoes a retroreflector to enhance the radiation that is received by the receivers. The user can interact with the game using natural movements. Alternatively, a user can hold an object that simulates a real world object, such as a retro-reflective baseball bat or a hairbrush. Further, a user can optionally hold a real baseball bat to simulate batting in a game.

In a first aspect of the invention, an apparatus for tracking motion includes a transmitter configured to irradiate one or more objects, a receiver that includes an array of detectors arranged to receive reflected radiation from the one or more objects, a controller programmed to use the reflected radiation to track a motion of the one or more objects, and one or more retroreflectors designed for attachment to corresponding hands or feet of a user. The apparatus includes a monitor configured to display an image, such as a pictorial representation of the one or more objects, substantially reproducing the motion of the one or more objects.

In one embodiment, the transmitter includes multiple light emitting diodes arranged to substantially uniformly illuminate an area containing the one or more objects. The array of detectors includes an array of charge coupled devices arranged in a rectangle. The shape of the array can be rectangular, square, uniform, or even non-uniform. Preferably, the receiver includes one or more lenses arranged to focus the reflected radiation onto the array of charge coupled devices.

In one embodiment, the one or more objects include feet, and the controller is further programmed to separately track motion of both feet.

In one embodiment, the controller is also programmed to compare the motion to a predetermined target motion. In this embodiment, when the apparatus is used to track dance steps, the steps can be compared to the correct steps, allowing the user to measure her progress.

In other embodiments, the one or more objects include a hairbrush or a sporting equipment such as a bat, a club, a racket, a glove, a ball, a bow, a gun, or a fishing reel.

In a second aspect of the invention, a method of tracking motion includes irradiating one or more objects, each supporting a corresponding retroreflector attached to a hand or foot, receiving radiation reflected from the one or more retroreflectors onto an array of detectors, and tracking motion of the one or more objects using the reflected radiation. An image reproducing the motion is displayed on a computer monitor. The image includes a picture of the one or more objects, such as a picture of dancing feet, a rolling bowling ball, a gun, or a swinging golf club or bat.

In a third aspect of the invention, an apparatus includes a transceiver, a controller, and a monitor. The transceiver includes a transmitter and an array of detectors. The transmitter is arranged to irradiate one or more retroreflectors attached to feet, and the array of detectors is positioned to receive reflected radiation from the one or more retroreflectors. The controller is programmed to use the reflected radiation to determine motion of the one or more retroreflectors. The monitor displays an image substantially reproducing the motion in a virtual game environment.

BRIEF DESCRIPTION OF THE DRAWINGS

The novel features of the invention are set forth in the appended claims. However, for purpose of explanation, several embodiments of the invention are set forth in the following figures.

FIG. 10A shows a perspective view of a baseball video game device according to an embodiment of the present invention.

FIG. 10B shows a perspective view of a golf video game device according to an embodiment of the present invention.

FIG. 10C shows a perspective view of a tennis video game device according to an embodiment of the present invention.

FIG. 11A shows a perspective view of a kick boxing video game device according to an embodiment of the present invention.

FIG. 11B shows a perspective view of a bowling video game device according to an embodiment of the present invention.

FIG. 11C shows a perspective view of a fishing video game device according to an embodiment of the present invention.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

Figure 1:
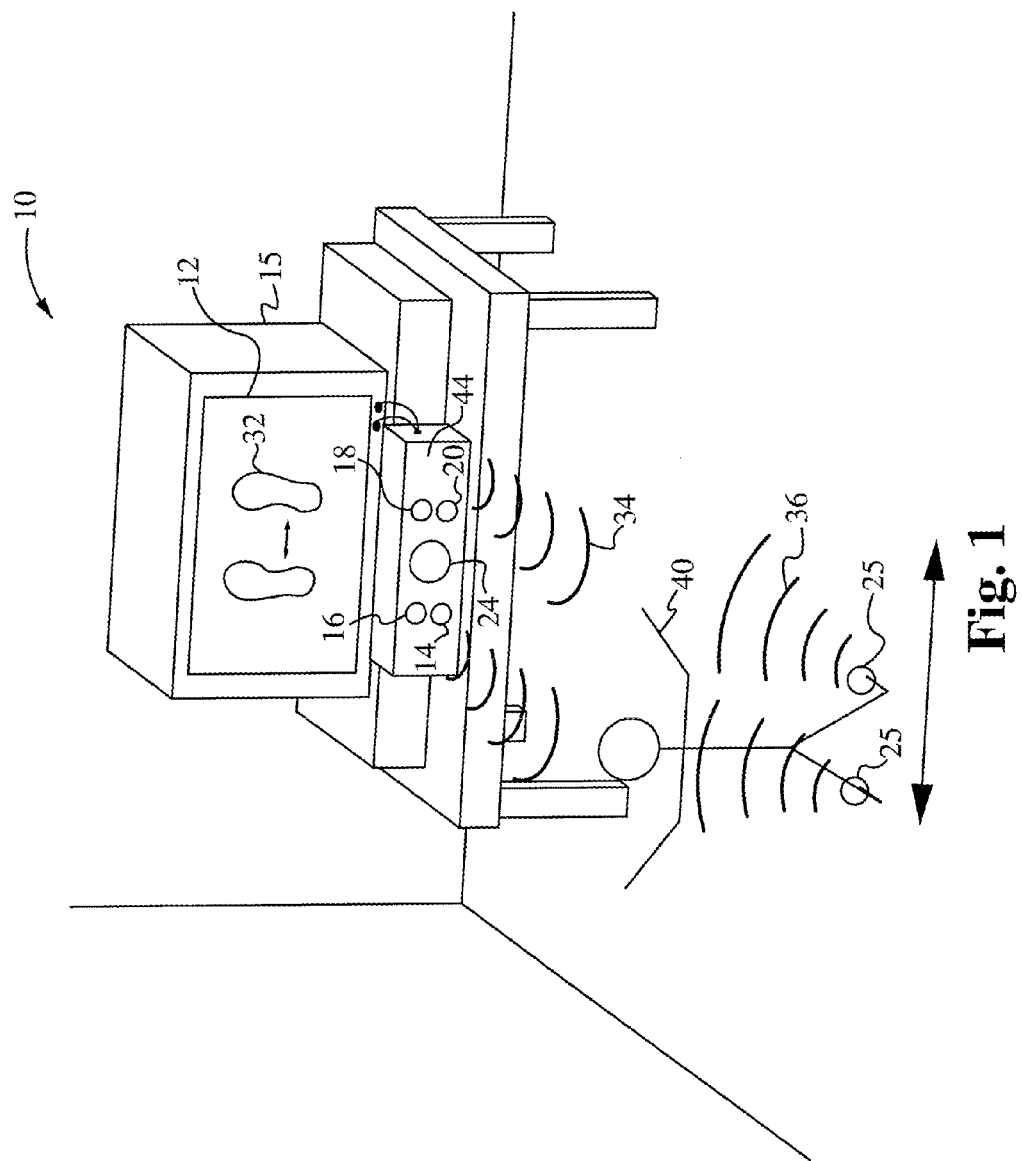
FIG. 1 shows a perspective view of a video game according to an embodiment of the present invention.
Figures 2, 3:
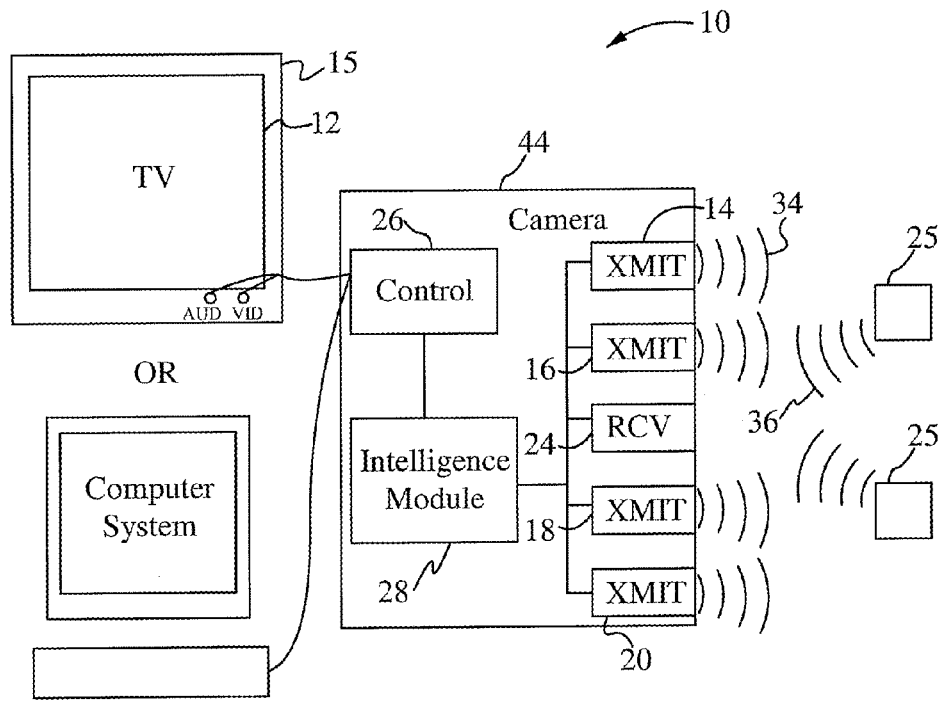
FIG. 2 is a functional block diagram of a video game device according to an embodiment of the present invention.
FIG. 3 shows an array of detectors according to an embodiment of the present invention.

FIG. 1 shows a first embodiment of the present invention. A video game device 10 having a display screen 12 of a display device 15 and a console 44 is shown. In the preferred embodiment, there are two light (e.g., optical) transmitters, though more can alternatively be used. In an exemplary, embodiment, a plurality of light transmitters 14, 16, 18, 20 form a light transmitter array. A light receiver or detection array 24 is centrally located between the transmitters 14, 16, 18, 20. The optical transmitters 14, 16, 18, 20 can be infrared transmitters, though other types of light transmitters (e.g., visible and non-visible), other optical transmitters, or other kinds of energy radiators can also be used. The detection array 24 can be a charge coupled device (CCD) and can include a lens. It will be apparent to those of ordinary skill in the art that other detectors can be used, in other configurations. Each transmitter 14, 16, 18, 20 and the detection array 24 is coupled to a control circuit 26 via an intelligence module 28 (FIG. 2). The intelligence module 28 is coupled to the control circuit 26 to facilitate detection of a user motion or activity. The control circuit 26 is included in the console 44 to control a sensed user position as an image or a cursor on the screen 12. Retroreflective "tags" or retroreflectors 25 are coupled to the feet or ankles of a player 40 or other part of the body. The retroreflectors 25 can include clips or buckles to mount to the user's shoes or can be on a Velcro® strap and mounted around the user's ankles. The retroreflectors 25 act as retroreflectors of light radiation that is transmitted by the transmitters 14, 16, 18, 20. In one embodiment, the video game device 10 can be plug and play. The plug and play video game device 10 does not require an extensive set up or programming by the user. The video game device 10 is operable by simply plugging into an audio and video jack of the display device 15 such as a television or audio and video jacks of a VCR, DVD player, or computer input.

In FIG. 1, the feet of the user 40 are shown to move first to the left and then in the right direction. If the video game device 10 is operating in a conventional display mode, the image of the user's feet will traverse a path on the screen 12 mimicking (illustrated at 32) the path traversed by the movement of the user's feet. In an exemplary embodiment, the image appears as footprints 32 on the screen 12.

FIG. 2 shows a more detailed view of the transmitters 14, 16, 18, 20, the detection array 24 and the retroreflectors 25. As in all the figures, identical labels refer to identical components. In an exemplary embodiment, the transmitters 14, 16, 18, 20 are light emitting diodes (LEDs) and the detection array is an array of CCD receivers, such as used in some digital cameras, or an array of photo transistors. In addition, FIG. 2 shows a representation of the transmitted light radiation 34 and the reflected radiation 36. The radiation 34 is transmitted from the transmitters 14, 16, 18, 20. The radiation 34 is transmitted in all directions. For certain applications, the transmitted radiation can be columnized using lenses. Some portion of the transmitted radiation 34 will strike the retroreflectors 25. That portion of the radiation 34 striking the retroreflectors 25 will be reflected, also in all directions. Using the array of transmitters 14, 16, 18, 20 in combination with the detection array 24 allows determination of distance and movement of the retroreflectors 25 within three dimensional space. Such information facilitates the operation of certain video games.

The strength of reflected radiation must exceed background radiation levels.

Preferably, the detection array 24 is configured as a two dimensional array of receiver detectors, such as an array of CCD devices. In some embodiments, there can be receive optics positioned over the detection array 24. The detection array 24 can be positioned to view an area of a surface, such as the floor. A user wearing retroreflectors 25 within the field of view on the floor will reflect radiation from the retroreflectors 25 to the detection array 24. Certain elements in the detection array 24 will correspond to certain positions within the field of view on the floor. When a user's foot wearing a retroreflector 25 is in a location in the field of view, light radiation will be reflected and impinge on the corresponding elements in the detection array 24. In this way, the detection array 24 can operate in a manner analogous to a digital camera. It will be appreciated that the detection array 24 can be configured to identify a user's foot when the sensed radiation exceeds a predetermined threshold for each of the elements in the detection array 24.

The intelligence module 28 can detect a wide range of user motions or activities. The intelligence module 28 comprises a microprocessor configured to interact with the transmitters 14, 16, 18, 20 and the detection array 24. The intelligence module 28 interprets reflected radiation from the retroreflectors 25 and determines the user motion. The intelligence module 28 is configured to mimic an "intuitive" controller since multiple user activities can be determined. For example, the user can simulate a baseball swing and the intelligence module 28 determines the user motion to be a baseball swing. Alternatively, the user can simulate a golf swing and the intelligence module 28 determines the user motion to be a golf swing. The intelligence module 28 can be configured to distinguish the action of the user to be a baseball swing or a golf swing. The intelligence module 28 can determine patterns of reflected radiation received from the detection array 24 since certain elements in the detection array 24 correspond to certain positions within the three dimensional field of view of the detection array 24. The intelligence module 28 can also determine the strength of reflected radiation and detect if the user motion is mostly a vertical motion as in a golf swing or a horizontal motion as in a baseball swing.

FIG. 3 shows the receiver 24 in accordance with one embodiment of the invention, formed from an array of detectors 200. In one embodiment, each of the detectors 200 is a charge coupled device, such that the array of detectors 200 functions as a camera. As shown in FIG. 3, each detector is labeled by an alpha-numeric character denoting its row and column. For example, the detector labeled "A3" is in the first row ("A") and the third column. Similarly, the detector labeled "F8" detector is in the sixth row and eighth column.

Figure 4A:
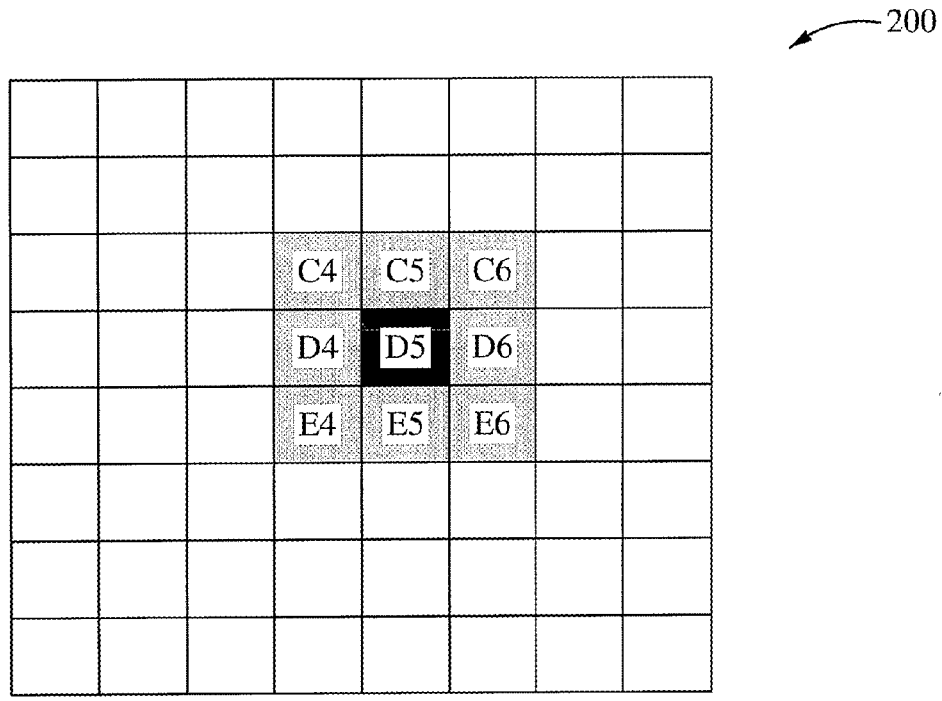
FIGS. 4A-B show the array of detectors in FIG. 3, tracking a moving object.
Figure 4B:
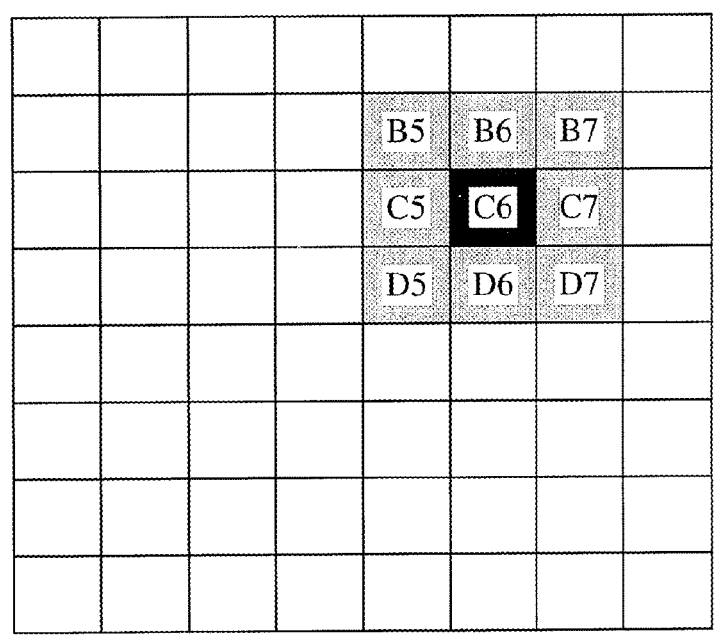
Figure 6B:
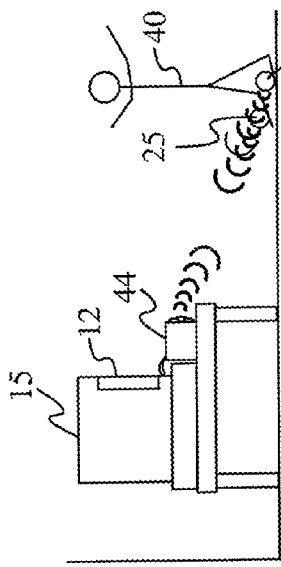
FIGS. 6B and 6C show side and top views, respectively, of a video game device according to an embodiment of the present invention.
Figure 6C:
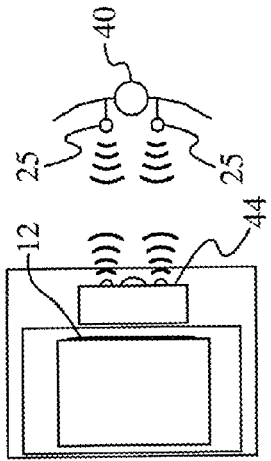
Figure 6A:
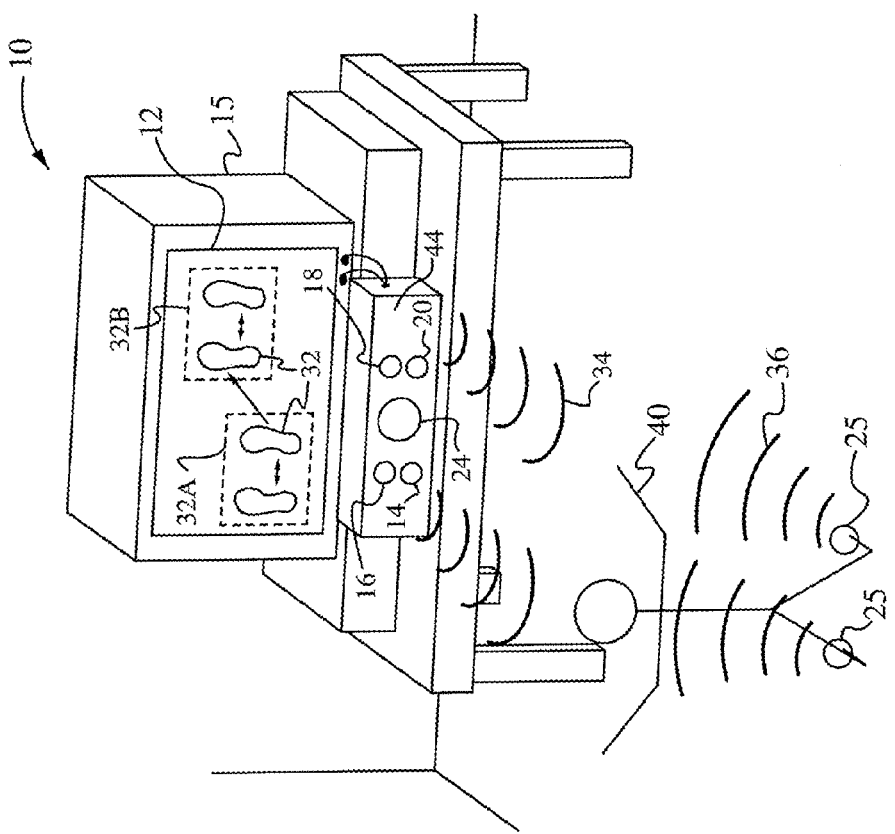
FIG. 6A shows a perspective view of a video game device according to an embodiment of the present invention.

FIGS. 4A and 4B show the array of detectors 200 receiving radiation reflected from a moving object. To make FIGS. 4A and 4B easier to read, only those labels necessary to explain the drawings are included. As shown by the relative shadings in FIG. 4A, the detector D5 receives the most radiation (e.g., illumination) reflected from the object. The detectors C4-C6, D4, D6, and E4-6 receive less radiation, and the remaining detectors receive none at all. At a later time, shown by FIG. 4B, with the object still being irradiated, the detector C5 receives the most radiation reflected from the object. The detectors B5-B7, C5, C7, and D5-D7 receive less radiation, and the remaining detectors receive none at all. This relative "movement" of radiation indicates that the object has moved in a direction corresponding to movement from D5 to C6. Referring to FIG. 6A below, this movement is "reproduced" by moving the feet images 32 from location 32A to 32B.

While the array of detectors 200 is an 8×8 square, detectors of other sizes and configurations can also be used. Some examples includes larger square arrays, such as 256×256 array; smaller square arrays, such as 4×4; rectangular arrays; other uniform arrays, as well as non-uniform arrays. Those skilled in the art will recognize that different size and different configuration arrays can be selected to fit the application at hand.

Figure 5:
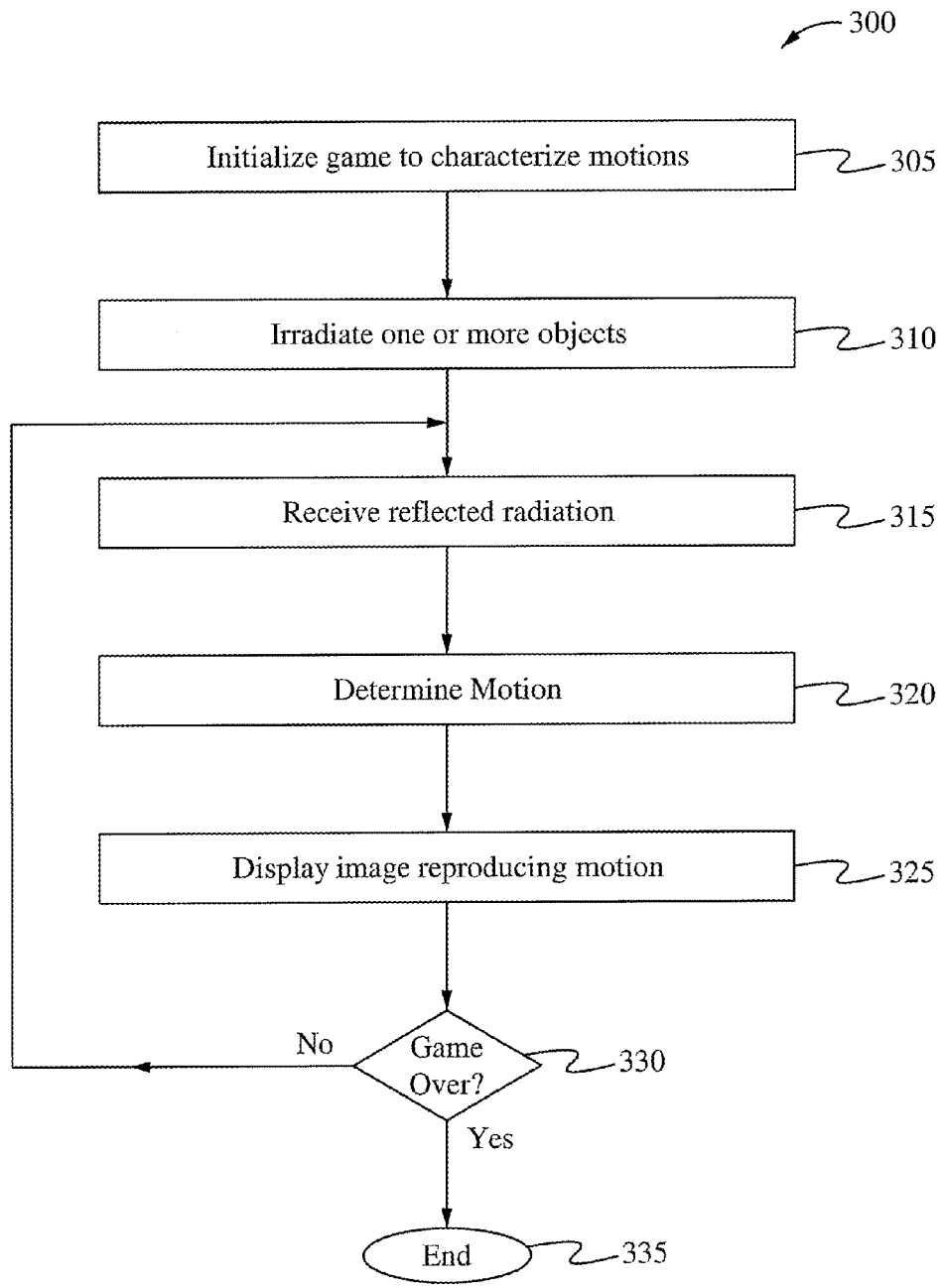
FIG. 5 shows the steps of a method for reproducing the motion of an object according to one embodiment of the invention.

FIG. 5 shows the steps 300 of tracking and reproducing motion in a game device in accordance with one embodiment of the invention. In the step 305, a game device is initialized to characterize motions. For example, if the game device is used to track and display moving feet, the user motions are "characterized by" and translated to moving feet. The game device is now ready for playing.

Referring to the device 10 of FIG. 1 to explain the steps 300: In the step 310 radiation is transmitted from the transmitters 14, 16, 18, 20, reflected off the retroreflectors 25, and, in the step 315, received at the receiver 24. In this example, the retroreflectors are attached to feet. When the steps 310 and 315 are performed sequentially, the motion of the feet are determined in the step 320. In the step 325, an image corresponding to the moving feet are displayed on the screen 12.

In the step 330, the method determines whether the game is finished. If the game is finished, the method proceeds to the step 335, where the game ends. Otherwise, the method loops back to the step 315.

Referring to FIGS. 2 and 5, in one embodiment each of the steps 300 is performed in either the control circuit 26 or the intelligence module 28. In one embodiment, the control circuit 26 and the intelligence module 28 include a computer-readable medium containing computer readable instructions executed by a processor to perform the steps 300.

The steps 300 are only exemplary. Some steps can be added, some steps can be deleted, and the steps can be performed in different orders than the one shown.

The retroreflectors 25 located within the volume of space sensed by embodiments of the present invention will be represented on the display screen 12 at a particular location. As the retroreflectors 25 moved and are positioned in a new location the relative analogue change in position will be displayed on the screen 12. More precise position identification can be obtained through the use of precision components, such as optical lenses and circuitry.

In an exemplary embodiment of the present invention, it is desirable for the video game device 10 to sense the location of more than one object. Each of the players feet can be sensed separately. In FIGS. 6A-6C, the player 40 is positioned in order to see the display 12. The display 12 is controlled in the usual manner as describe above by the video game device 10 which in some circumstances may be a personal computer. The display 12 can show, among other things, a caricature of the player as a dancer in a venue.

The video game device 10 separately identifies a left foot movement and a right foot movement. It can sense forward, backward and sideways movement. When utilizing embodiments of the present invention, the location of each foot of the player 40 can be uniquely determined by having a retroreflector 25 attached to each foot of the player 40.

When utilizing embodiments of the present invention with this game, the control circuitry 26 can be set to register movement of the retroreflectors 25 after a particular threshold of reflected signal is received. This signifies that the player's feet are at least as close as some predefined limit to the detection array 24. In the event that the player's feet are farther from the detection array 24 than allowable to achieve the appropriate threshold, no foot movement is indicated on the game screen 12. When the player's feet and the retroreflectors 25 approach the detection array 24 sufficiently close that the threshold is crossed, the display screen 12 will then indicate movement of the player's left or right foot.

The transmitters 14, 16, 18, 20 and the detection array 24 can be used to sense the reflected signal from the retroreflectors 25 and avoid the problem of having a left foot being misinterpreted as a right foot. Accordingly, the video game device 10 can distinguish the player's left foot from her right foot using kinematic rules whereby assumptions are made. These include assuming that at least one foot is always on the ground in static states and dynamic states with the exception of jumps.

Figure 7A:
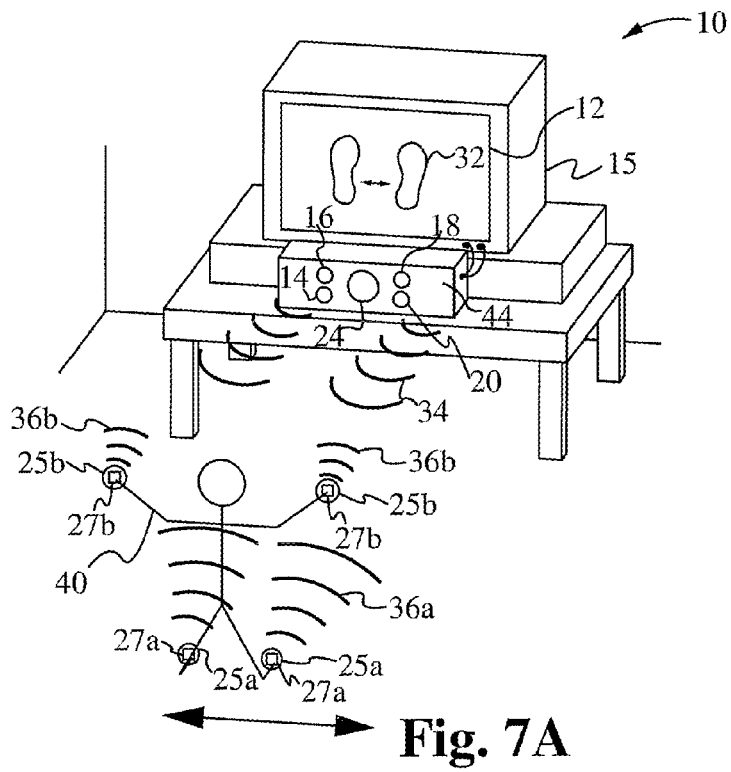
FIG. 7A shows a perspective view of a video game device according to an alternative embodiment of the present invention.
Figure 7B:
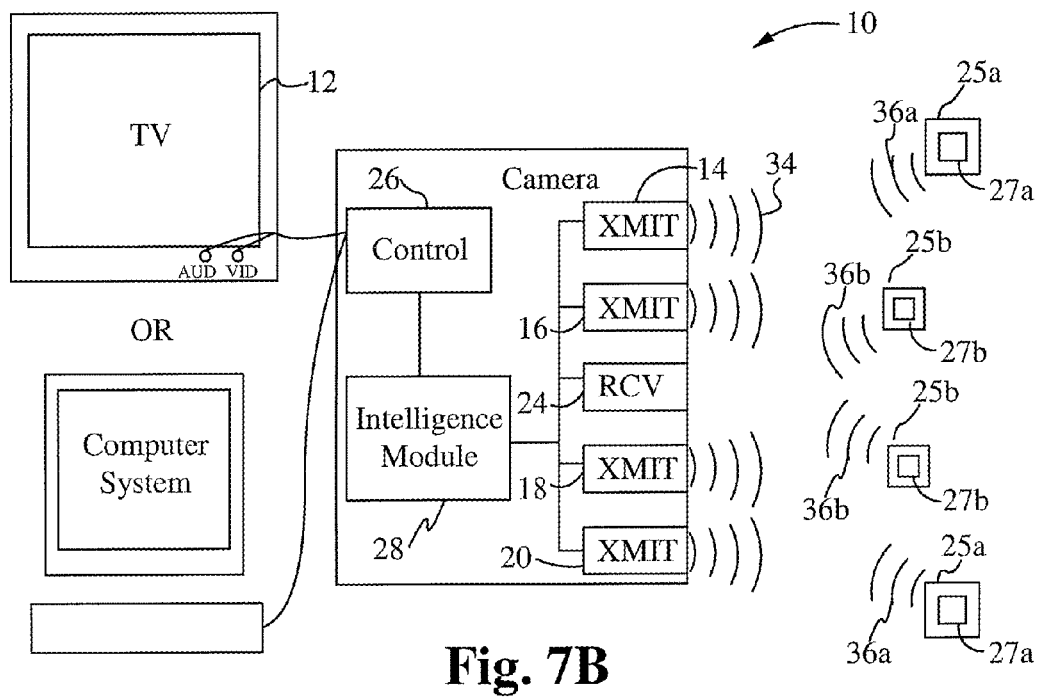
FIG. 7B is a functional block diagram of a video game device according to an alternative embodiment of the present invention.

FIGS. 7A and 7B show an alternative embodiment of the video game device 10. The video game device 10 includes the light transmitters 14, 16, 18, 20, the detection array 24 and a first pair of retroreflectors 25a on the user's feet and a second pair of retroreflectors 25b on the user's hands. Each of the first and second pair of retroreflectors 25a, 25b can include a filter element 27a, 27b respectively. In an exemplary embodiment, the transmitters 14, 16, 18, 20 are infrared light emitting diodes (LEDs) and the detection array is an array of CCD receivers, such as used in some digital cameras, or an array of photo transistors. In addition, FIGS. 7A and 7B show a representation of the transmitted radiation 34 and the reflected radiation 36a and 36b. The radiation 34 is transmitted from the transmitters 14, 16, 18, 20. The radiation is transmitted in all directions. Some portion of the transmitted radiation 34 will strike the first pair of retroreflectors 25a and the second pair of retroreflectors 25b. That portion of the radiation striking the first and second pair of retroreflectors 25a, 25b will be reflected, also in all directions. Using the array of transmitters 14, 16, 18, 20 in combination with the detection array 24 allows determination of distance and movement of the first and second pair of retroreflectors 25 within three dimensional space.

The detection array 24 can be positioned to view an area, such as the three dimensional space in front of the video display device 12. A user 40 wearing the first and second pair of retroreflectors 25a, 25b within the field of view in the area will reflect light radiation from the retroreflectors 25a, 25b to the detection array 24. Certain elements in the detection array 24 will correspond to certain positions within the field of view in the area. When a user's feet wearing the retroreflectors 25a or the user's hands wearing the retroreflectors 25b are in a location in the field of view, radiation will be reflected and impinge on the corresponding elements in the detection array 24. In this way, the detection array 24 can operate in a manner analogous to a digital camera. It will be appreciated that the detection array 24 can be configured to identify a user's feet or hands when the sensed reflected radiation exceeds a predetermined threshold for each of the elements in the detection array 24.

The intelligence module 28 interprets reflected radiation from the first and second pairs of retroreflectors 25a, 25b and determines the user motion. The intelligence module 28 is configured to mimic an intuitive controller since multiple user activities can be determined. For example, the user can simulate a baseball swing and the intelligence module 28 determines the user motion to be a baseball swing. The intelligence module 28 can determine patterns of reflected radiation received from the detection array 24 since certain elements in the detection array correspond to certain positions within the three dimensional field of view of the detection array 24. The intelligence module 28 and the control circuit 26 are configured to detect and determine if reflected radiation 36a is from the first pair of retroreflectors 25a or reflected radiation 36b is from the second pair of retroreflectors 25b. Identifying the source of reflected radiation 36a, 36b can be facilitated with the filter elements 27a, 27b. The filter elements 27a, 27b can be active or passive devices that modify the transmitted radiation 34. Alternatively, the intelligence module 28 and the control circuit 26 can similarly be configured to distinguish the movement of the user's right hand from the left hand or the right foot from the left foot.

Figure 8A:
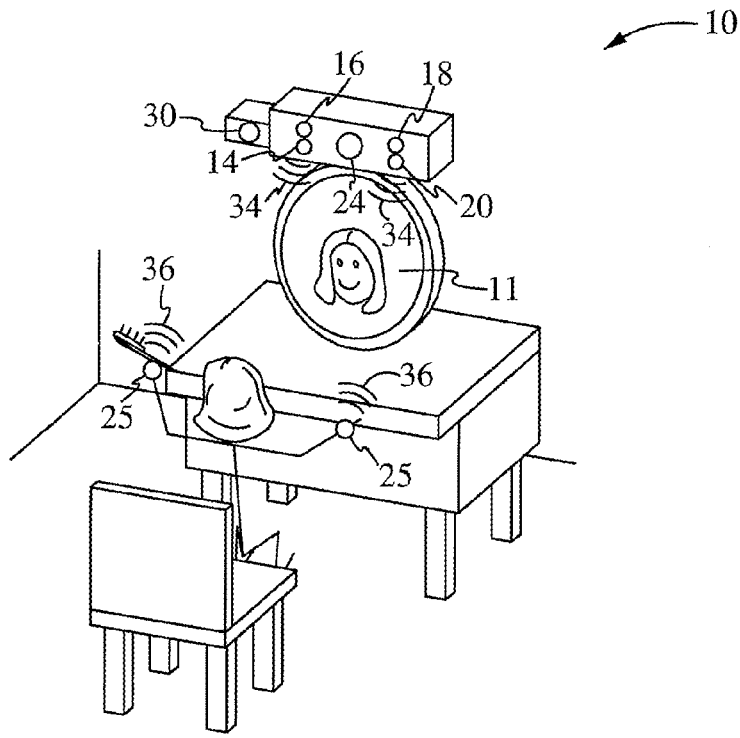
FIG. 8A shows a perspective view of a video game device according to another embodiment of the present invention.
Figure 8B:
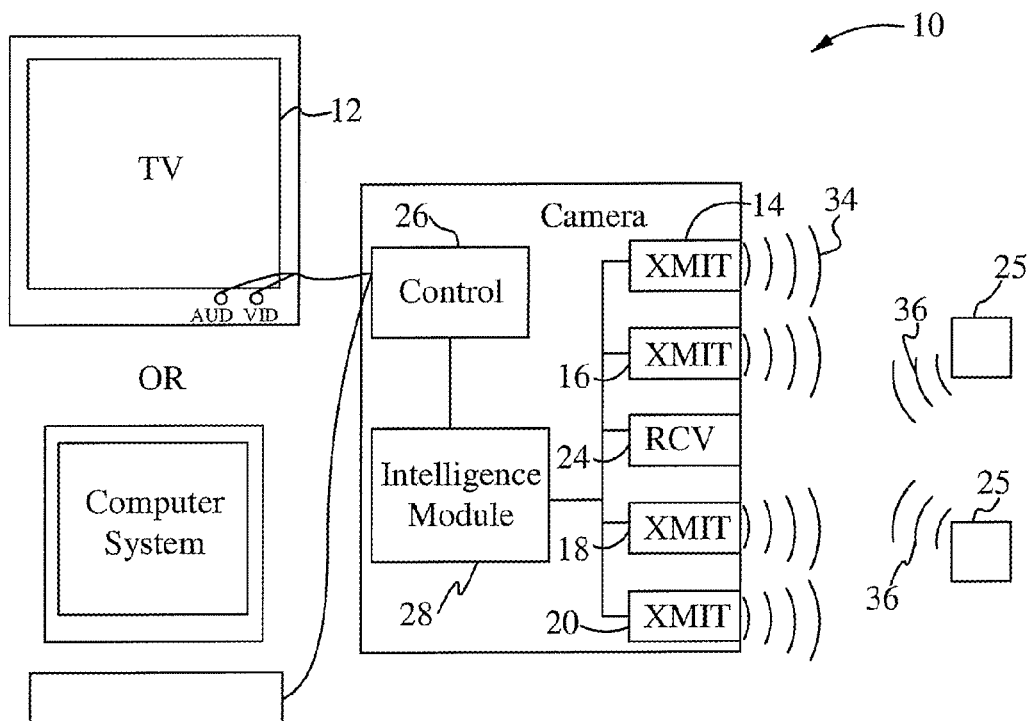
FIG. 8B shows a functional block diagram of a video game device according to another embodiment of the present invention.

FIGS. 8A and 8B show an alternative embodiment of the video game device 10. The video game device 10 includes the light transmitters 14, 16, 18, 20, the detection array 24 and retroreflectors 25. An audio device 30 such as a speaker is also included. In an alternative embodiment, each of the retroreflectors 25 can include a filter element as in the previous embodiment. In an exemplary embodiment, the transmitters 14, 16, 18, 20 are light emitting diodes (LEDs) and the detection array is an array of CCD receivers such as in some digital cameras or an array of photo transistors. In addition, FIGS. 8A and 8B show a representation of the transmitted radiation 34 and the reflected radiation 36. The radiation 34 is transmitted from the light transmitters 14, 16, 18, 20. The radiation is transmitted in all directions. Some portion of the transmitted radiation 34 will strike the retroreflectors 25. That portion of the radiation striking the retroreflectors 25 will be reflected, also in all directions. Using the array of transmitters 14, 16, 18, 20 in combination with the detection array 24 allows determination of distance and movement of the first and second pair retroreflectors 25 within three dimensional space.

The detection array 24 can be positioned to receive radiation within an area, such as the three dimensional space in front of a display device configured as a pretend mirror 11. A user wearing the retroreflectors 25 within the field in the area will reflect radiation from the retroreflectors 25 to the detection array 24. Certain elements in the detection array 24 will correspond to certain positions within the field of view in the area. When a user's hands wearing the retroreflectors 25 are in a location in the field of view, light radiation will be reflected and impinge on the corresponding elements in the detection array 24. In this way, the detection array 24 can operate in a manner analogous to a digital camera. It will be appreciated that the detection array 24 can be configured to identify a user's hands when the sensed radiation exceeds a predetermined threshold for each of the elements in the detection array 24.

The intelligence module 28 interprets reflected radiation from the retroreflectors 25 and determines the user motion. The intelligence module 28 is configured to mimic an intuitive controller since multiple user activities can be determined. The intelligence module 28 can determine patterns of reflected radiation received from the detection array 24 since certain elements in the detection array correspond to certain positions within the three dimensional field of view of the detection array 24. The intelligence module 28 and the control circuit 26 can be configured to distinguish the movement of the user's right hand from left hand. For example, the user's hand motion can be determined as a grooming activity such as combing of the hair or brushing the teeth. In this way, the video gaming device can facilitate learning proper grooming habits as a grooming game.

Figure 9A:
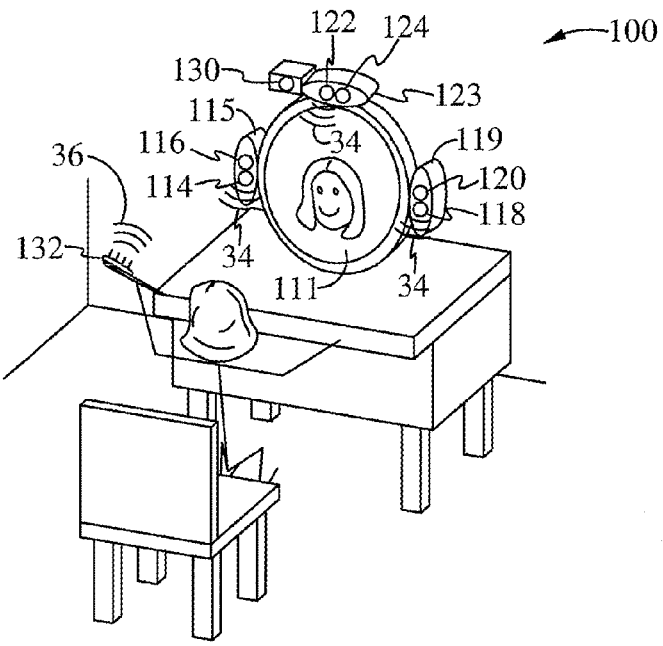
FIG. 9A shows a perspective view of a video game device according to yet another embodiment of the present invention.
Figure 9B:
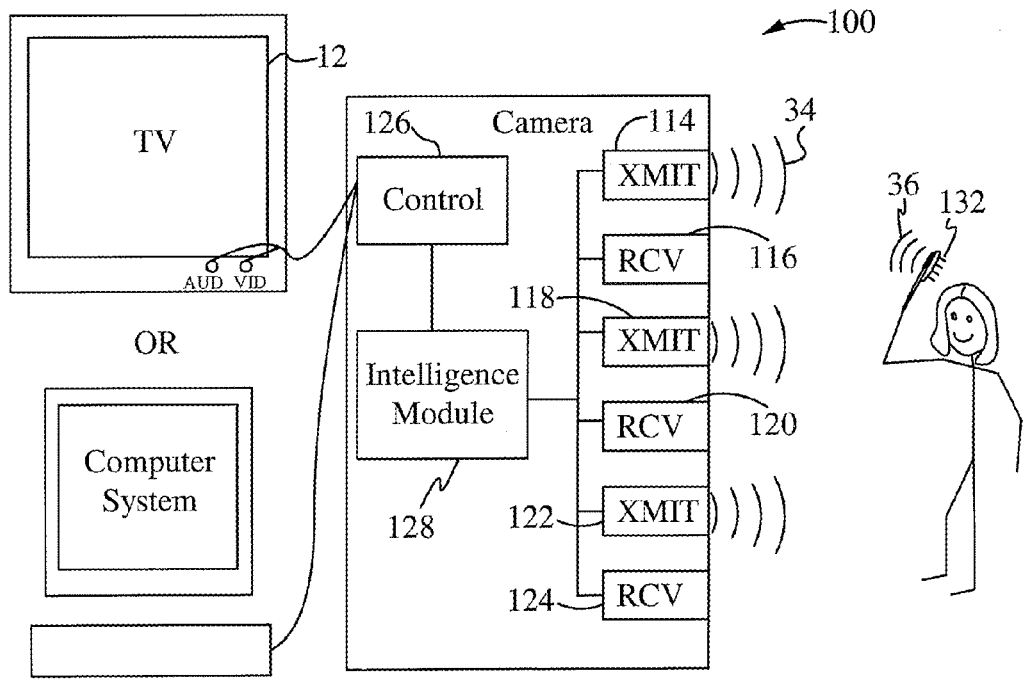
FIG. 9B shows a functional block diagram of a video game device according to yet another embodiment of the present invention.

FIGS. 9A and 9B show an alternative embodiment of the video game device 100 for playing a grooming game. The video game device 100 includes light transmitters 114, 118, 122 and the light receivers 116, 120, 124. An audio device 130 such as a speaker is also included. The light transmitter and receiver pairs 114, 116, 118, 120 and 122, 124 form transceivers 115, 119 and 123 respectively. FIGS. 9A and 9B show a representation of the transmitted light radiation 34 and the reflected radiation 36. The light radiation 34 is transmitted from the transmitters 114, 120, 122. The radiation is transmitted in all directions. Some portion of the transmitted radiation 34 will strike the user's body, for example the user's hand and a brush 132. That portion of the radiation striking the brush 132 will be reflected, also in all directions. Using the array of light transmitters 114, 118, 122 in combination with the light receivers 116, 120, 124 allows determination of distance and movement of the user's body and the brush 132 within three dimensional space. It will be appreciated that the brush 132 can be identified when the sensed light radiation exceeds a predetermined threshold for each of the light receivers 116, 118, 124.

The intelligence module 128 interprets reflected radiation from the user motion. The intelligence module 128 can determine patterns of reflected radiation received from the transceivers 115, 119, 123 within the three dimensional field of view. The intelligence module 128 and the control circuit 126 can be configured to distinguish the movement of the user's right hand from left hand. In an alternative embodiment, the brush 132 can include a filter element as in previous embodiments. In still another embodiment, the user can wear retroreflectors as in previous embodiments.

In an alternative embodiment, a cooking game with multiple venues can be substituted for the grooming game of the previous embodiment. In another embodiment, driving a car or flying a plane can be simulated using a device in accordance with the present invention. In still another embodiment, electronic devices such as personal computers or DVDs can be controlled by determining a user's movement as certain commands.

Figure 10D:
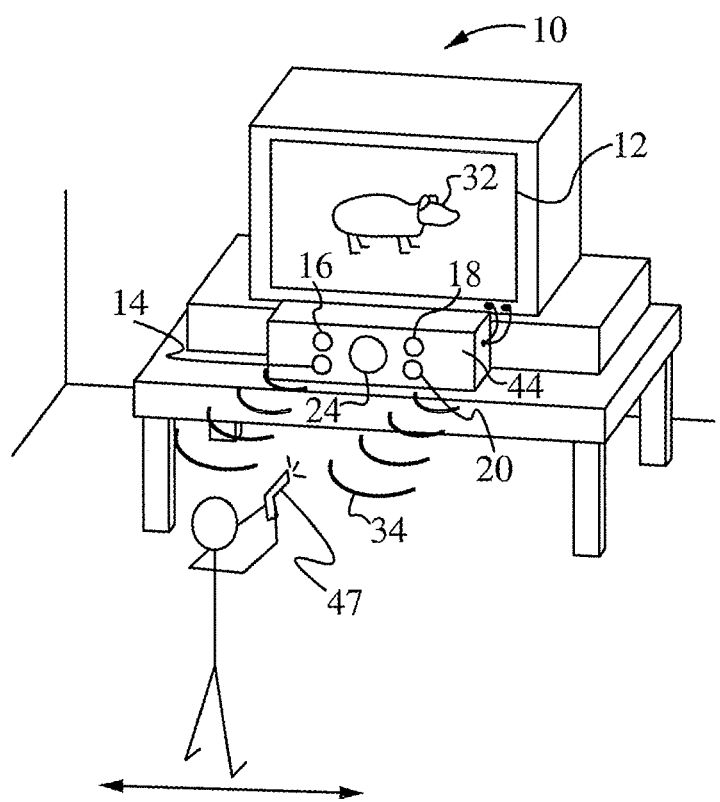
FIG. 10D shows a perspective view of a shooting video game device according to an embodiment of the present invention.

FIGS. 10A-10D show alternative embodiments of the video game device 10 of FIG. 2. As shown in FIG. 10A, the device 10 includes light transmitters 14, 16, 18, 20, the detection array 24 and the game piece or bat 42. A representation is shown of the transmitted light radiation 34 and the reflected radiation 36. The radiation 34 is transmitted from the transmitters 14, 16, 18, 20. The radiation 34 is transmitted in all directions. For certain applications, the transmitted radiation 34 can be columnized using lenses. Some portion of the transmitted radiation 34 will strike the bat 42. That portion of the radiation striking the bat 42 will be reflected, also in all directions. Using the array of transmitters 14, 16, 18, 20 in combination with the detection array 24 allows determination of distance and movement of the bat 42 within three dimensional space.

In some embodiments, there can be receive optics positioned over the detection array 24. The detection array 24 can be positioned to view an area in front of the detection array 24. A user holding the bat 42 within the field of view will reflect light radiation from the bat 42 to the detection array 24. Certain elements in the detection array 24 will correspond to certain positions within the field of view. When the bat 42 is in a location in the field of view, radiation will be reflected and impinge on the corresponding elements in the detection array 24. In this way, the detection array 24 can operate in a manner analogous to a digital camera. It will be appreciated that the detection array 24 can be configured to identify the bat 42 when the sensed radiation exceeds a predetermined threshold for each of the elements in the detection array 24.

The intelligence module 28 in the console 44 interprets reflected radiation from the bat 42 and determines the user motion. The intelligence module 28 is configured to mimic an "intuitive" controller since multiple user activities can be determined. The intelligence module 28 can determine the strength of reflected radiation and detect if the user motion is mostly a vertical motion as in a golf swing or a horizontal motion as in a baseball swing. The intelligence module 28 interprets and determines a swing arc "A" to be a baseball swing and registers a response on the display 12 by manipulating the cursor or presentation 32.

FIG. 10B shows the device 10 including light transmitters 14, 16, 18, 20, the detection array 24 and the game piece or golf club 44. A representation is shown of the transmitted radiation 34 and the reflected radiation 36. The light radiation 34 is transmitted from the transmitters 14, 16, 18, 20. The radiation is transmitted in all directions. Some portion of the transmitted radiation 34 will strike the golf club 44. That portion of the radiation striking the golf club 44 will be reflected, also in all directions. Using the array of transmitters 14, 16, 18, 20 in combination with the detection array 24 allows determination of distance and movement of the golf club 44 within three dimensional space.

In some embodiments, there can be receive optics positioned over the detection array 24. The detection array 24 can be positioned to view an area in front of the detection array 24. A user holding the golf club 44 within the field of view will reflect light radiation from the golf club 44 to the detection array 24. Certain elements in the detection array 24 will correspond to certain positions within the field of view. When the golf club 44 is in a location in the field of view, radiation will be reflected and impinge on the corresponding elements in the detection array 24. In this way, the detection array 24 can operate in a manner analogous to a digital camera. It will be appreciated that the detection array 24 can be configured to identify the golf club 44 when the sensed radiation exceeds a predetermined threshold for each of the elements in the detection array 24.

The intelligence module 28 in the console 44 interprets reflected radiation from the golf club 44 and determines the user motion. The intelligence module 28 is configured to mimic an "intuitive" controller since multiple user activities can be determined. The intelligence module 28 can determine the strength of reflected radiation and detect if the user motion is mostly a vertical motion as in a golf swing or a horizontal motion as in a baseball swing. The intelligence module 28 interprets and determines a swing arc "B" to be a golf swing and registers a response on the display 12 by manipulating the cursor or presentation 32.

FIG. 10C, shows an alternative embodiment including a game piece or tennis racket 46. Again, radiation is transmitted from the transmitters 14, 16, 18, 20, reflected off the tennis racket 46, and received at the detection array 24. The intelligence module 28 in the console 44 determines the user motion along a swing arc 'C' to be a tennis swing and registers a response on the display 12 by manipulating the cursor or presentation 32. FIG. 10D, shows an alternative embodiment including a gun game piece 47. Again, radiation is transmitted from the transmitters 14, 16, 18, 20, reflected off the gun game piece 47, and received at the detection array 24. The intelligence module 28 in the console 44 determines the user motion "tracking" the hunting target 32. In one embodiment, the user jerks the gun 47 to signify a shot. The detection array 24 and intelligence module 28 together recognize this motion as a shot. Based on the aim determined from the detection array 24, the intelligence module 28 determines whether the target 32 was struck. In another embodiment, the gun game piece 47 generates an audible noise when its trigger is pulled to signify a shot. In still another embodiment, the gun game piece 47 includes other means recognized by the intelligence module to indicate a shot. The gun game piece 47 can itself reflect radiation or it can include a retroreflector that reflects radiation. Alternatively, a retroreflector can be attached directly to a user's hand to reflect radiation in accordance with embodiments of the invention.

FIGS. 11A-11C similarly show additional embodiments of the video game device 10 of FIG. 2. FIG. 11A, shows an alternative embodiment including a game piece or boxing gloves 48. Some embodiments can include retroreflectors 25. The intelligence module 28 in the console 44 determines the user motion to be a punch or jab and registers a response on the display 12 by manipulating the cursor or presentation 32. For example, in a kick boxing game either a hand motion or a foot motion could register as a blow to the opponent. FIG. 11B, shows an alternative embodiment including a game piece or bowling ball 50. The intelligence module 28 in the console 44 determines the user motion along the swing arc "D" to be a throw of the bowling ball 50 and registers a response on the display 12 by manipulating the cursor or presentation 32. For example, in a bowling game a motion of the bowling ball 50 could register as a strike or other combination. FIG. 11C, shows an alternative embodiment including a game piece or fishing rod 52. The intelligence module 28 determines the user motion to be a cast of the fishing line and registers a response on the display 12 by manipulating the cursor or presentation 32. In the embodiments of FIGS. 11A-C, radiation is transmitted from the transmitters 14, 16, 18, 20, reflected off the boxing gloves and retroreflectors 25 (FIG. 11A), bowling ball 50 (FIG. 11B), a fishing rod 52 (FIG. 11C), respectively, and received at the receiver 24, and processed as described in the other embodiments above.

Figure 12A:
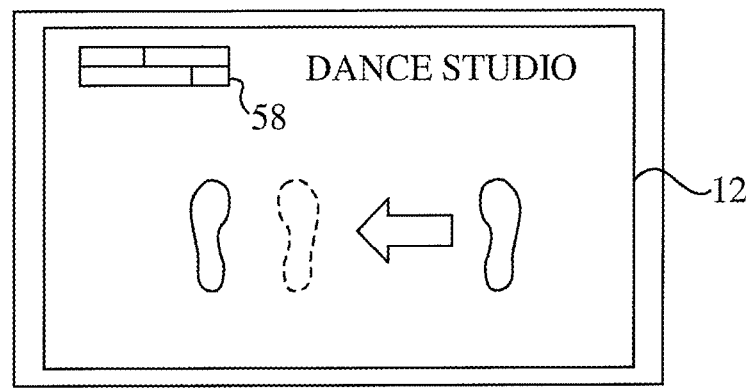
FIG. 12A illustrates playing a video game device according to an embodiment of the present invention.
Figure 12B:
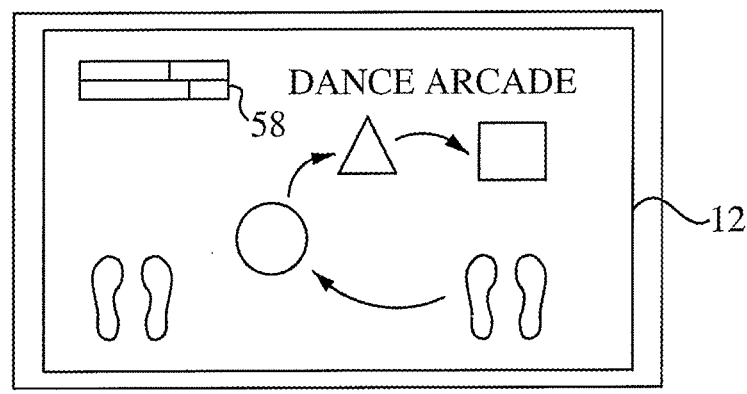
FIG. 12B illustrates playing a video game device according to an alternative embodiment of the present invention.

FIG. 12A shows one embodiment of a method of playing a video game. Referring to FIGS. 1 and 12A, the player 40 simply plugs the console 44 into her TV, attaches the retroreflectors 25 to her feet and literally steps into the game, using her body as the game controller. As the player 40 moves her feet, their movements will be mirrored by their 'virtual footprints' on the screen 12. To play, the player 40 can follow actual footprint icons as they appear on the screen 12 to the beat of the music. The pace and difficulty level of the dance moves can gradually increase and the player 40 will be scored on her accuracy. The player 40 can track her accuracy by observing an accuracy meter 58 on the screen 12. The video game device 10 can include energetic, fast-paced graphics and multiple levels of game play for each song. As the player 40 improves her skills, she can unlock additional levels of game play and new dance venues. In one embodiment, the player 40 can enjoy a game alone. Alternatively, the player 40 can challenge an additional player to face off arcade-style (FIG. 12B). To face off arcade style, the player 40 passes the retroreflectors 25 to the additional player. Alternatively, both players 40 can wear retroreflectors and dance within the field of view of the detection array 24. The video game device 10 will keep track of each player's score.

Figure 12C:
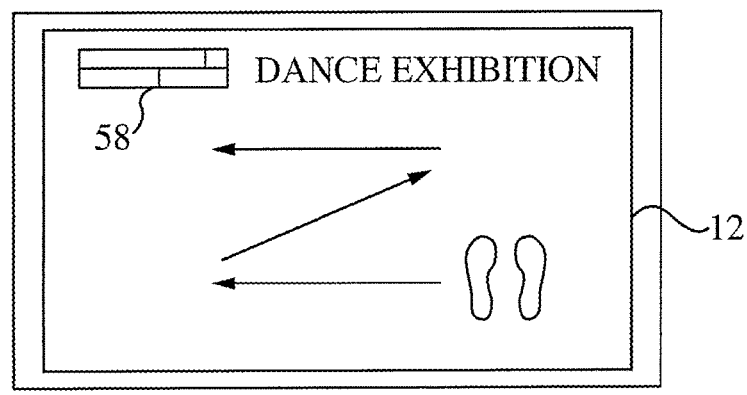
FIG. 12C illustrates playing a video game device according to yet another embodiment of the present invention.

FIG. 12C shows an alternate embodiment of a method of playing a video game. The player 40 is challenged to follow along in an additional dance venue. The player 40 plugs the console 44 into a TV, attaches the wireless retroreflectors 25 to her feet and literally steps into the game. The player 40 uses her body as the game controller. As the player moves her feet, their movements will be mirrored by the virtual footprints on the screen 12. To play, the player 40 can follow actual footprint icons as they appear on the screen 12 to recall an assortment of unique dance moves. The pace and difficulty level of the footprint icons can gradually increase and the player 40 will be scored on her accuracy. The player 40 can track her accuracy by observing an accuracy meter 58 on the screen 12. The video game device 10 can include energetic, fast-paced graphics and multiple levels of game play for each venue. As the player 40 improves her skills, she can unlock additional levels of game play and new lounge venues.

Figure 12D:
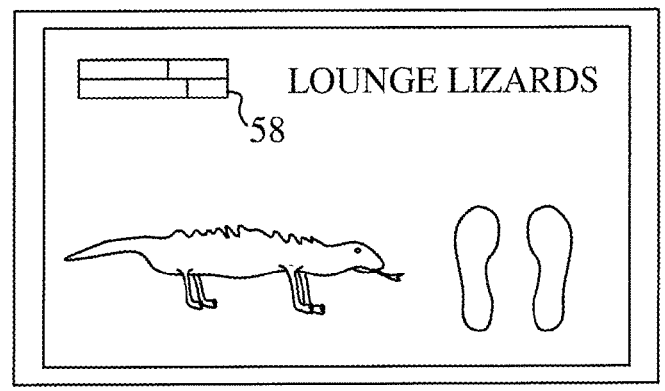
FIG. 12D illustrates playing a video game device according to an embodiment of the present invention.

FIG. 12D shows an alternative embodiment of a method of playing a video game, in which the player 40 is challenged to escape from a notorious lounge filled with lizard-type characters. The player 40 plugs the console 44 into a TV, attaches the wireless retroreflectors 25 to her feet and literally steps into the game. The player 40 uses her body as the game controller. As the player moves her feet, their movements will be mirrored by their virtual footprints on the screen 12. To play, the player 40 can follow actual footprint icons as they appear on the screen 12 to the beat of the music and to escape the lizard-type characters. The pace and difficulty level of the footprint icons will gradually increase and the player 40 will be scored on her accuracy. The video game device 10 can include energetic, fast-paced graphics and three levels of game play for each venue. As the player 40 improves her skills, she can unlock additional levels of game play and new lounge venues. In one embodiment, the player 40 can enjoy a game alone. Alternatively, the player 40 can challenge an additional player to face off arcade-style. The video game device 10 will keep track of each player's score.

Figure 12E:
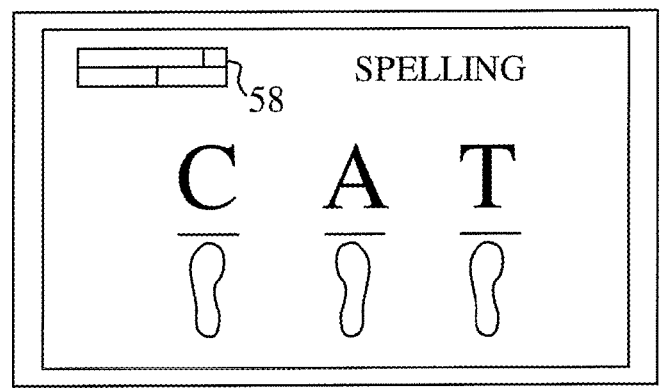
FIG. 12E illustrates playing a video game device according to an alternative embodiment of the present invention.

FIG. 12E shows an alternative embodiment of a method of playing a video game, in which the player 40 is challenged to spell interesting words. The player 40 plugs the console into a TV, attaches the wireless retroreflectors 25 to her feet and literally steps into the game. The player 40 uses her body as the game controller. As the player moves her feet, her movements will be mirrored by the virtual footprints on the screen 12. To play, the player 40 can follow actual footprint icons as they appear on the screen to the beat of the music and to choose the proper letters as they appear on the screen 12. In one embodiment, the letters can scroll across the display 12 until the player 40 chooses the letter with proper placement of the retroreflectors 25. Alternatively, the letters can appear to fly into the scene and continue flying until being selected by the player 40 with proper movement of the retroreflectors 25. The pace and difficulty level of the footprint icons will gradually increase and the player 40 will be scored on her accuracy. The video game device 10 can include energetic, fast-paced graphics and three levels of game play for each venue. As the player 40 improves her skills, she can unlock additional levels of game play and new venues for spelling. In one embodiment, the player 40 can enjoy a game alone. Alternatively, the player 40 can challenge an additional player to face off arcade-style. The video game device 10 will keep track of each player's score.

Figure 12F:
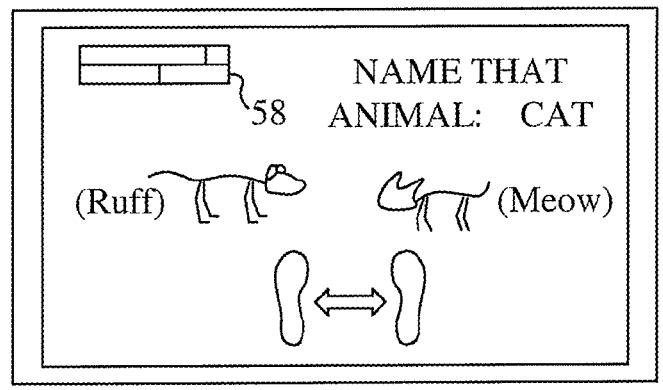
FIG. 12F illustrates playing a video game device according to yet another embodiment of the present invention.

FIG. 12F shows an alternative embodiment of a method of playing a video game, in which the player 40 is challenged to name interesting objects. The player 40 plugs the console into a TV, attaches the wireless retroreflectors 25 to her feet and literally steps into the game. The player 40 uses her body as the game controller. As the player moves her feet, their movements will be mirrored by their virtual footprints on the screen 12. To play, the player 40 can follow actual footprint icons as they appear on the screen 12 to the beat of the music and to choose the proper objects as they appear on the screen 12. In one embodiment, the object can scroll across the display 12 until the player 40 chooses the object with proper placement of the retroreflectors 25. Alternatively, the objects can appear to fly into the scene and continue flying until being selected by the player 40 with proper movement of the retroreflectors 25. The pace and difficulty level of the footprint icons will gradually increase and the player 40 will be scored on her accuracy. The video game device 10 can include energetic, fast-paced graphics and three levels of game play for each venue. As the player 40 improves her skills, she can unlock additional levels of game play and new venues for spelling. In one embodiment, the player 40 can enjoy a game alone. Alternatively, the player 40 can challenge an additional player to face off arcade-style. The video game device 10 will keep track of each player's score.

Still other embodiments exploit the fact that when flesh is close to an optical receiver (e.g., within one foot or less), the reflective nature of flesh approximates that of a retroreflector. In these embodiments, flesh, such as an exposed hand or foot, can substitute for a retroreflector. This permits a user's hands to be images for gaming and control applications. As one example, players use a computer to compete against one another in the game Rock, Scissors, Paper. The gestures for rock, scissors, and paper are all visually different enough for a computer to robustly recognize their shapes and process them in real time.

Figure 13A:
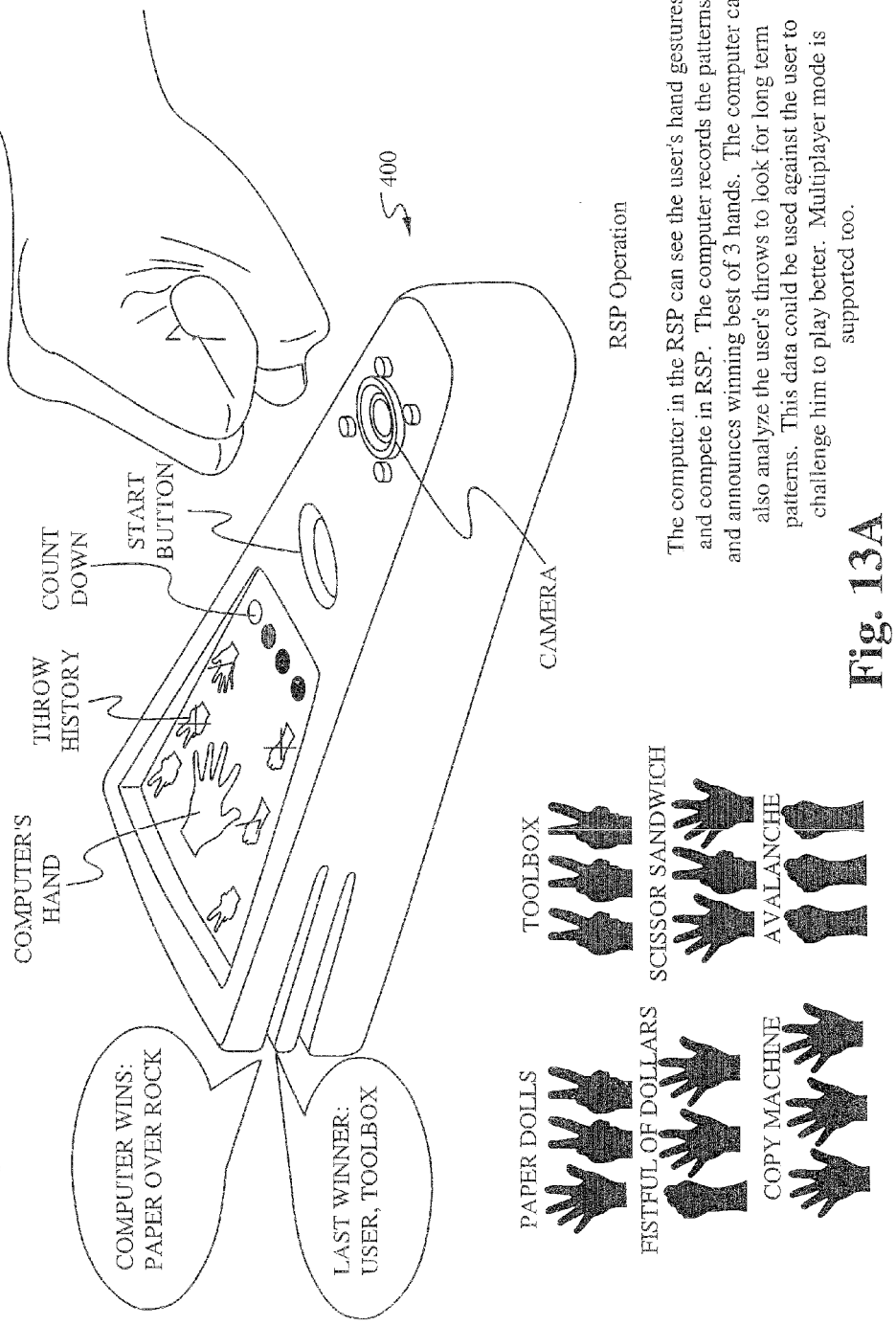
FIG. 13A shows an electronic device for playing "Rock, Paper, Scissors" according to one embodiment of the present invention.
Figure 13B:
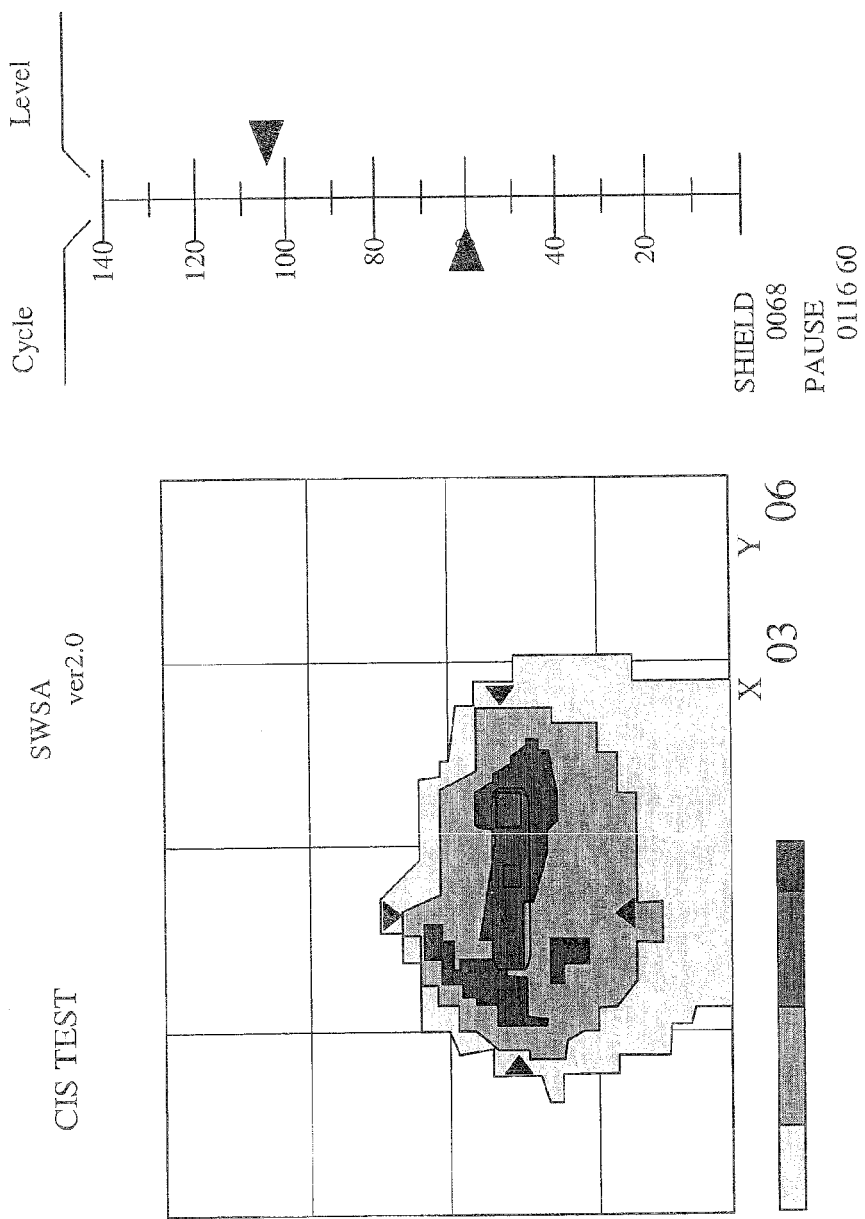
FIGS. 13B-D show the results of a CIS test and corresponding cycle and level readings for "Rock," "Paper," "Scissors" gestures, respectively, according to embodiments of the present invention.
Figure 13C:
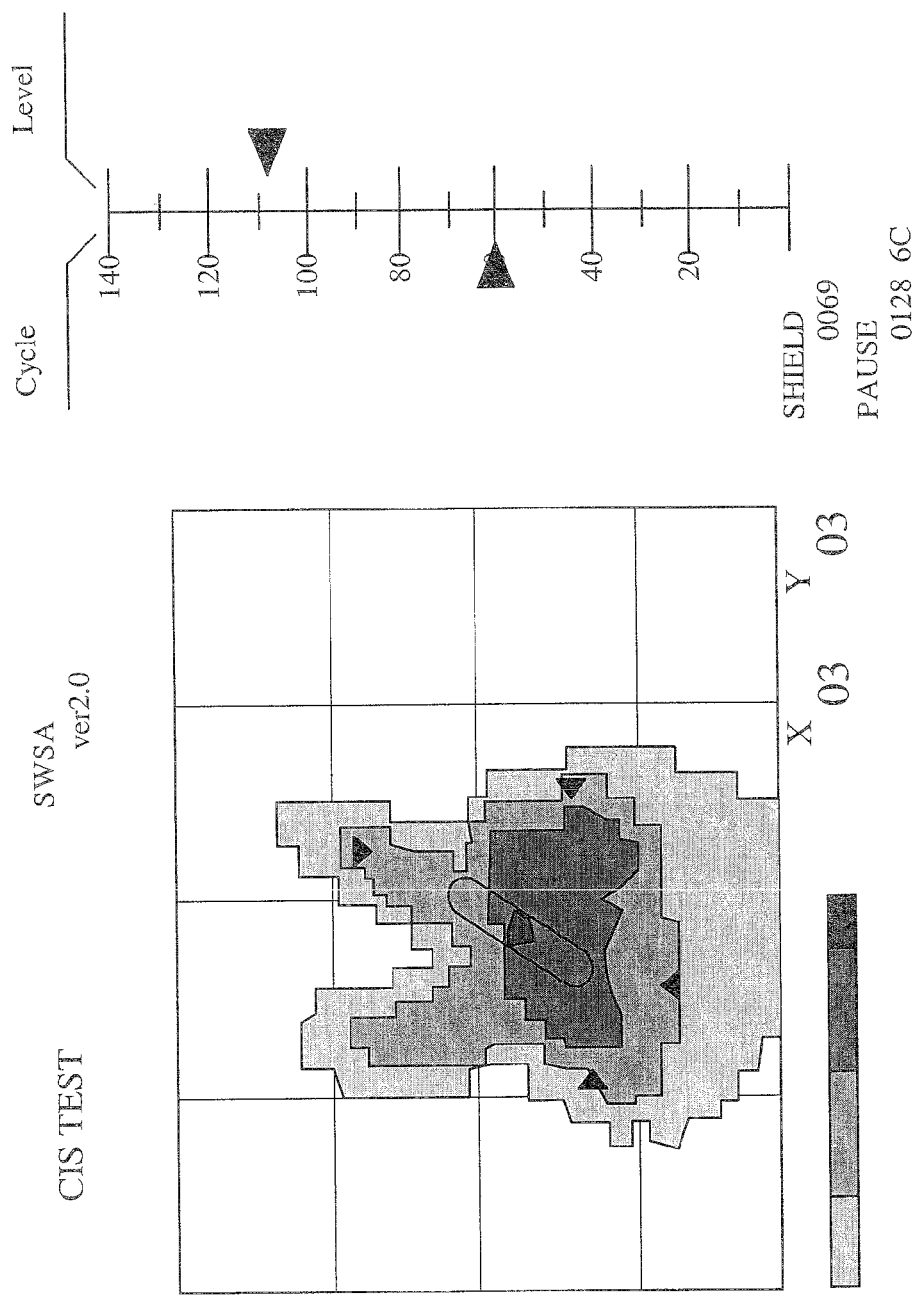
Figure 13D:
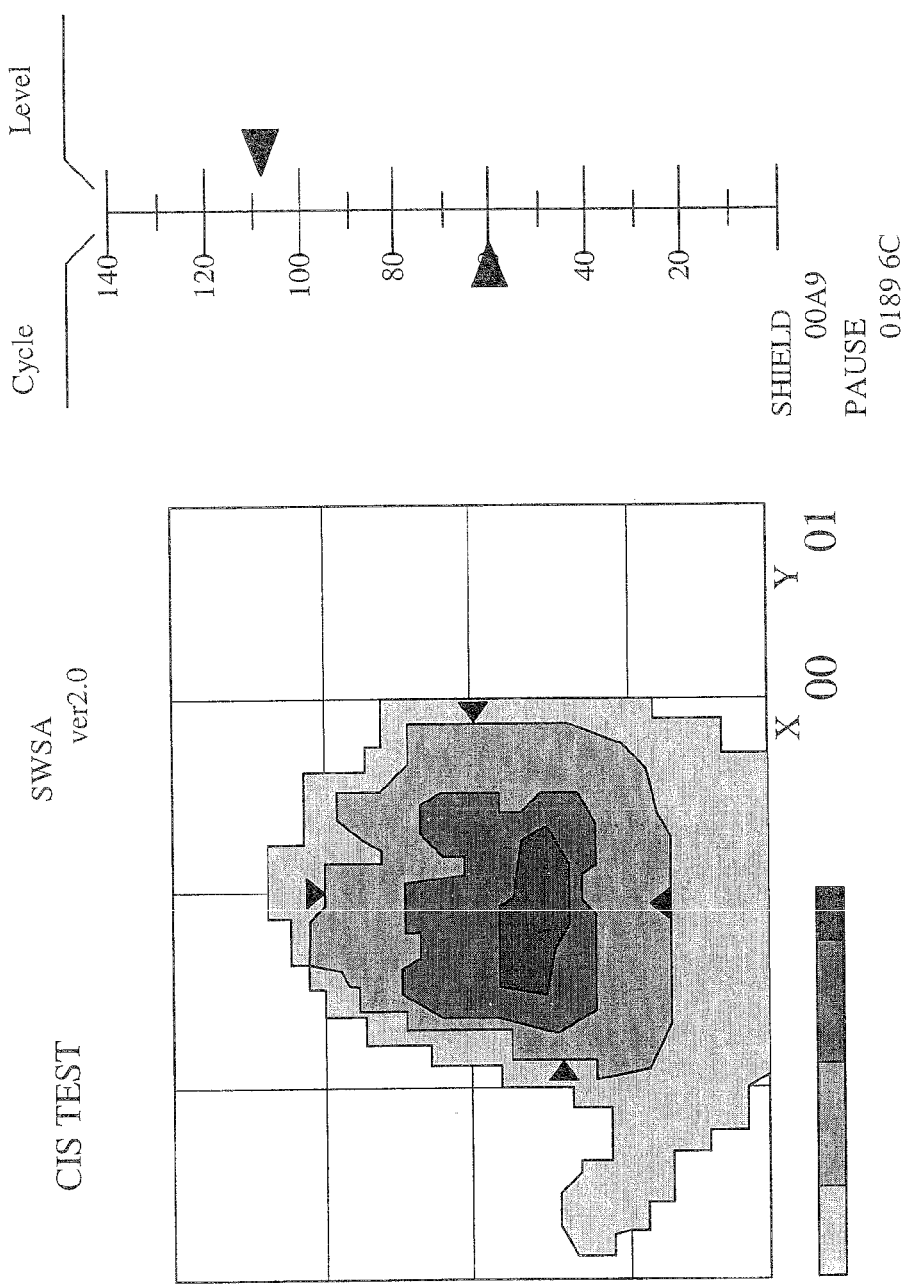

FIG. 13A shows an electronic device 400 for recognizing gestures in accordance with the invention to play an electronic version of "Rock, Paper, Scissors." In this embodiment, the hand is close enough to the receivers (here labeled "camera") to function as a retroreflector. FIG. 13B shows a result of a CIS test for a hand making a "Rock" gesture. FIG. 13B also shows, adjacent to the result, corresponding readings of cycle and level. FIG. 13C shows a result of a CIS test for a hand making a "Paper" gesture. FIG. 13C also shows, adjacent to the result, corresponding readings of cycle and level. FIG. 13D shows a result of a CIS test for a hand making a "Scissor" gesture. FIG. 13D also shows, adjacent to the result, corresponding readings of cycle and level. Together, FIGS. 13B-D illustrate how the Rock, Paper, Scissors gestures can be distinguished from one another.

While the examples illustrate using embodiments of the invention in various games and activities, it will be appreciated that embodiments can also be used in other games, including, but not limited to, sword games, ping pong, billiards, archery, rifle shooting, aviation (e.g., flight simulation), and race car driving, to name only a few. Further, while some embodiments describe transmitting and receiving light energy for tracking objects, other types of radiant energy can be used. Further, while the examples discussed are generally directed to video games, it will be appreciated that the invention finds use in other applications other than games. One other embodiment, for example, includes a self-contained electronic device that tracks motion as described above and provides audio feedback.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. An apparatus for tracking motion comprising:
a transmitter configured to irradiate one or more objects;
a receiver comprising an array of detectors arranged to receive reflected radiation from the one or more objects;
a controller programmed to use the reflected radiation to track a motion of the one or more objects; and
one or more retroreflectors, designed for attachment to the one or more objects, wherein the array of detectors comprises an array of charge coupled devices and wherein the receiver comprises one or more lenses arranged to focus the reflected radiation onto the array of charge coupled devices, such that the controller tracks the motion of the one or more objects by tracing the movement of a first area receiving a first level of reflected radiation and a second area receiving a second level of reflected radiation, wherein the first level of the reflected radiation is higher than the second level of reflected radiation, and the controller distinguishes among the one or more retroreflectors using kinematic rules.

2. The apparatus of claim 1, further comprising a monitor configured to display an image substantially reproducing the motion of the one or more objects.

3. The apparatus of claim 1, wherein each of the one or more retroreflectors comprises a filter element configured to modify transmitted radiation from the transmitter.

4. The apparatus of claim 1, wherein the transmitter comprises multiple light emitting diodes arranged to substantially uniformly illuminate an area containing the one or more objects.

5. The apparatus of claim 1, wherein the array of charge coupled devices is rectangular.

6. The apparatus of claim 1, wherein the one or more objects comprise feet, and the controller is further programmed to separately track motion of both feet.

7. The apparatus of claim 1, wherein the controller is further programmed to compare the motion to a predetermined target motion.

8. The apparatus of claim 1, wherein the one or more objects comprise a hairbrush.

9. The apparatus of claim 3, wherein the filter element is a passive device.

10. The apparatus of claim 3, wherein the filter element is an active device.

11. A method of tracking motion comprising:
irradiating one or more objects each supporting a corresponding retroreflector, wherein each retroreflector includes a filter element;
receiving radiation reflected from the one or more retroreflectors onto an array of detectors;
tracking motion of the one or more objects by tracing the movement of a first area receiving a first level of reflected radiation and a second area receiving a second level of reflected radiation, wherein the first level of the reflected radiation is higher than the second level of reflected radiation; and
analyzing the motion to determine patterns of game play.

12. The method of claim 11, further comprising displaying an image on a monitor substantially reproducing the motion.

13. The method of claim 12, wherein the image comprises a picture of the one or more objects.

14. The method of claim 11, wherein the array of detectors comprises an array of charge coupled devices.

15. The method of claim 14, further comprising focusing the reflected radiation onto the array of charge coupled devices.

16. The method of claim 11, wherein the one or more objects comprise feet.

17. The method of claim 11, wherein the one or more objects comprise a sporting apparatus.

18. The method of claim 17, wherein the sporting apparatus is a bat, a club, a racket, a glove, a ball, a bow, a gun, or a fishing reel.

19. The method of claim 11, wherein the motion is used to select a character displayed to a user.

20. A system comprising:
at least one external object each having a diffusively reflective surface; and
a self-contained electronic device configured to detect the at least one external object and to learn from current and past characteristics of each external object to thereby control at least one application element, wherein the self-contained electronic device comprises a controller configured to track a motion of the one or more objects by tracing the movement of a first area receiving a first level of reflected radiation and a second area receiving a second level of reflected radiation, wherein the first level of the reflected radiation is higher than the second level of reflected radiation.

21. The system of claim 20, wherein the self-contained electronic device includes a camera.

22. The system of claim 20, wherein the diffusively reflective surface comprises one of skin and clothing.

23. An apparatus for tracking motion comprising:
a transmitter configured to irradiate one or more objects;
a receiver comprising an array of detectors arranged to receive reflected radiation from the one or more objects;
a controller programmed to use the reflected radiation to track a motion of the one or more objects; and
one or more retroreflectors, each designed for attachment to the one or more objects,
wherein the array of detectors comprises an array of charge coupled devices and wherein the receiver comprises one or more lenses arranged to focus the reflected radiation onto the array of charge coupled devices, such that the controller tracks the motion of the one or more objects by tracing the movement of a first area receiving a first level of reflected radiation and a second area receiving a second level of reflected radiation, wherein the first level of the reflected radiation is higher than the second level of reflected radiation, and the controller distinguishes the type of motion.

* * * * *